(12) United States Patent
Wang et al.

(10) Patent No.: US 12,043,283 B2
(45) Date of Patent: Jul. 23, 2024

(54) DETECTION OF NEAR-RANGE AND FAR-RANGE SMALL OBJECTS FOR AUTONOMOUS VEHICLES

(71) Applicant: NODAR Inc., Somerville, MA (US)

(72) Inventors: Jing Wang, Fremont, CA (US); Leaf Alden Jiang, Concord, MA (US)

(73) Assignee: NODAR Inc., Somerville, MA (US)

( * ) Notice: Subject to any disclaimer, the term of this patent is extended or adjusted under 35 U.S.C. 154(b) by 0 days.

(21) Appl. No.: 18/163,930

(22) Filed: Feb. 3, 2023

(65) Prior Publication Data

US 2023/0356743 A1 Nov. 9, 2023

Related U.S. Application Data

(63) Continuation of application No. 17/682,163, filed on Feb. 28, 2022, now Pat. No. 11,577,748.
(Continued)

(51) Int. Cl.
*G06T 7/593* (2017.01)
*B60W 60/00* (2020.01)
*G06V 20/58* (2022.01)

(52) U.S. Cl.
CPC ......... *B60W 60/001* (2020.02); *G06V 20/58* (2022.01); *B60W 2420/403* (2013.01); *B60W 2554/4049* (2020.02)

(58) Field of Classification Search
CPC ......... H04N 13/128; H04N 2013/0081; H04N 13/178; G06T 7/85; G06T 7/593
See application file for complete search history.

(56) References Cited

U.S. PATENT DOCUMENTS 6,392,688 B1 5/2002 Barmann et al.
8,208,716 B2 6/2012 Choi et al.
(Continued)

FOREIGN PATENT DOCUMENTS

DE 10 2012 009 577 A1 11/2012
EP 1 457 384 A1 9/2004
(Continued)

OTHER PUBLICATIONS

'Hammerhead 3D Vision' Platform for Automated Driving, Forbes, published Jan. 7, 2021 to Bishop, available at: https://www.forbes.com/sites/richardbishop1/2021/01/07/emerging-from-stealth-nodar-introduces-hammerhead-3d-vision-platform-for-automated-driving/?sh=22b3b5f77ff2 (Year: 2021) (Year: 2021).*
(Continued)

*Primary Examiner* — Kenneth J Malkowski
(74) *Attorney, Agent, or Firm* — Wolf, Greenfield & Sacks, P.C.

(57) ABSTRACT

A small-object perception system, for use in a vehicle, includes a stereo vision system that captures stereo images and outputs information identifying an object having a dimension in a range of ~20 cm to about ~100 cm in a perception range of ~3 meters to ~150 meters from the vehicle, and a system controller configured to receive output signals from the stereo vision system and to provide control signals to control a path of movement of the vehicle. The stereo vision system includes cameras separated by a baseline of ~1 meter to ~4 meters. The stereo vision system includes a stereo matching module configured to perform stereo matching on left and right initial images and to output a final disparity map based on a plurality of preliminary disparity maps generated from the left and right initial images, with the preliminary disparity maps having different resolutions from each other.

15 Claims, 10 Drawing Sheets
(4 of 10 Drawing Sheet(s) Filed in Color)

Related U.S. Application Data

(60) Provisional application No. 63/278,758, filed on Nov. 12, 2021, provisional application No. 63/253,772, filed on Oct. 8, 2021.

(56) References Cited

U.S. PATENT DOCUMENTS

| | | | |
|---|---|---|---|
| 8,797,387 | B2 | 8/2014 | Huggett et al. |
| 8,971,634 | B2 | 3/2015 | Barnum |
| 8,981,966 | B2 | 3/2015 | Stein et al. |
| 9,286,680 | B1 | 3/2016 | Jiang et al. |
| 9,369,689 | B1 | 6/2016 | Tran et al. |
| 9,509,979 | B2 | 11/2016 | Livyatan et al. |
| 9,958,964 | B2 | 5/2018 | Wurster |
| 10,097,812 | B2 | 10/2018 | Livyatan et al. |
| 10,244,228 | B2 | 3/2019 | Millett |
| 10,257,489 | B2 | 4/2019 | Nam |
| 10,430,959 | B2 | 10/2019 | Chang et al. |
| 10,567,748 | B2 | 2/2020 | Okouneva |
| 10,591,594 | B2 | 3/2020 | Oyaizu et al. |
| 10,965,929 | B1 | 3/2021 | Bellows et al. |
| 11,024,037 | B2 * | 6/2021 | Du ............ G06V 10/82 |
| 11,157,751 | B2 | 10/2021 | Kumano et al. |
| 11,282,234 | B2 | 3/2022 | Jiang et al. |
| 11,321,875 | B2 | 5/2022 | Jiang et al. |
| 11,321,876 | B2 | 5/2022 | Jiang et al. |
| 11,427,193 | B2 | 8/2022 | Jiang et al. |
| 11,577,748 | B1 | 2/2023 | Wang et al. |
| 11,782,145 | B1 | 10/2023 | Swierczynski et al. |
| 11,834,038 | B2 | 12/2023 | Jiang et al. |
| 2006/0140510 | A1 * | 6/2006 | Wallace ........... H04N 13/239 |
| | | | 382/285 |
| 2007/0070069 | A1 | 3/2007 | Samarasekera et al. |
| 2007/0291125 | A1 | 12/2007 | Marquet |
| 2009/0195371 | A1 | 8/2009 | Camus |
| 2010/0208034 | A1 * | 8/2010 | Chen ............... G06T 7/97 |
| | | | 348/E13.001 |
| 2011/0025548 | A1 | 2/2011 | Nickolaou |
| 2011/0050864 | A1 | 3/2011 | Bond |
| 2012/0321172 | A1 | 12/2012 | Jachalsky et al. |
| 2013/0063594 | A1 | 3/2013 | Hwang et al. |
| 2013/0188018 | A1 | 7/2013 | Stevens et al. |
| 2013/0329015 | A1 | 12/2013 | Pulli et al. |
| 2014/0119663 | A1 * | 5/2014 | Barnum .............. G06T 7/223 |
| | | | 382/192 |
| 2014/0267616 | A1 * | 9/2014 | Krig ............... H04N 13/271 |
| | | | 348/46 |
| 2015/0103147 | A1 | 4/2015 | Ho et al. |
| 2016/0323560 | A1 | 11/2016 | Jin et al. |
| 2016/0323561 | A1 | 11/2016 | Jin et al. |
| 2017/0278014 | A1 | 9/2017 | Lessmann et al. |
| 2017/0287169 | A1 | 10/2017 | Garcia |
| 2017/0307759 | A1 | 10/2017 | Pei et al. |
| 2017/0358092 | A1 | 12/2017 | Bliebel et al. |
| 2018/0007345 | A1 | 1/2018 | Bougnoux |
| 2019/0087186 | A1 | 3/2019 | Endo |
| 2019/0158813 | A1 | 5/2019 | Rowell et al. |
| 2019/0208181 | A1 | 7/2019 | Rowell et al. |
| 2019/0220989 | A1 | 7/2019 | Harmsen et al. |
| 2019/0289282 | A1 | 9/2019 | Briggs et al. |
| 2019/0295282 | A1 | 9/2019 | Smolyanskiy et al. |
| 2019/0304164 | A1 | 10/2019 | Zhang |
| 2020/0064483 | A1 | 2/2020 | Li et al. |
| 2020/0077073 | A1 | 3/2020 | Nash et al. |
| 2020/0346581 | A1 | 11/2020 | Lawson et al. |
| 2020/0409376 | A1 | 12/2020 | Ebrahimi Afrouzi et al. |
| 2021/0118162 | A1 * | 4/2021 | Fang ................. H04N 13/232 |
| 2021/0264175 | A1 | 8/2021 | Zhang et al. |
| 2021/0327092 | A1 | 10/2021 | Jiang et al. |
| 2021/0350576 | A1 | 11/2021 | Jiang et al. |
| 2021/0352259 | A1 | 11/2021 | Jiang et al. |
| 2022/0111839 | A1 | 4/2022 | Jiang et al. |
| 2023/0076036 | A1 | 3/2023 | Jiang et al. |

FOREIGN PATENT DOCUMENTS

| | | | | |
|---|---|---|---|---|
| JP | 2003-269917 | A | | 9/2003 |
| JP | 2008-022125 | A | | 1/2008 |
| JP | 2008-509619 | A | | 3/2008 |
| JP | 2015-136056 | A | | 7/2015 |
| JP | 2015-158749 | A | | 9/2015 |
| JP | 2016-048839 | A | | 4/2016 |
| JP | 2017-057058 | A | | 3/2017 |
| KR | 10-2009-0031998 | A | | 3/2009 |
| WO | WO 2016/171050 | A1 | | 10/2016 |
| WO | WO-2016171050 | A1 | * 10/2016 | .......... G01C 3/06 |
| WO | WO 2017/057058 | A1 | | 4/2017 |
| WO | WO 2017/209015 | A1 | | 12/2017 |
| WO | WO 2018/196001 | A1 | | 11/2018 |
| WO | WO 2021/150369 | A1 | | 7/2021 |

OTHER PUBLICATIONS

"Nodar Brick Demo", Vimeo, published Jan. 7, 2021 to Rosen, available at: https://vimeo.com/497966938 (Year: 2021).*

International Search Report and Written Opinion for International Application No. PCT/US2022/018132, mailed Jun. 16, 2022.

[No Author Listed] NODAR Brick Demo. Vimeo. https://vimeo.com/497966938. Jan. 7, 2021:1.

Achanta et al., SLIC superpixels compared to state-of-the-art superpixel methods. IEEE Transactions on Pattern Analysis and Machine Intelligence. May 29, 2012;34(11):2274-82.

Adi et al., Distance measurement with a stereo camera. Int. J. Innov. Res. Adv. Eng. Nov. 2017;4(11):24-7.

Ashigahara, How close has computer vision come to human vision? Difficulties and practical approaches to avoid them. Vision Systems for robots and their applications. Journal of the Institute of Image Information and Television Engineers. Dec. 1, 2006;60(12):1914-9.

Badino et al., Free space computation using stochastic occupancy grids and dynamic programming. Workshop on Dynamical Vision, ICCV, Rio de Janeiro, Brazil. Oct. 20, 2007;20:73.

Bishop, Emerging from stealth, NODAR introduces "Hammerhead 3D Vision" platform for automated driving. Forbes. https://www.forbes.com/sites/richardbishop1/2021/01/07/emerging-from-stealth-nodar-introduces-hammerhead-3d-vision-platform-for-automated-driving/?sh=22b3b5f77ff2. Jan. 7, 2021:1-11.

Cholakkal et al., LiDAR-Stereo Camera Fusion for Accurate Depth Estimation. 2020 AEIT International Conference of Electrical and Electronic Technologies for Automotive (AEIT Automotive). Nov. 18, 2020:1-6.

Dai et al., A Review of 3D Object Detection for Autonomous Driving of Electric Vehicles. World Electric Vehicle Journal. Sep. 2021;12(3):139.

Fan et al., Real-time stereo vision-based lane detection system. Measurement Science and Technology. May 24, 2018;29(7):074005.

Feng et al., Deep multi-modal object detection and semantic segmentation for autonomous driving: Datasets, methods, and challenges. IEEE Transactions on Intelligent Transportation Systems. Feb. 17, 2020;22(3):1341-60.

Guindel et al., Automatic extrinsic calibration for lidar-stereo vehicle sensor setups. 2017 IEEE 20th International Conference on Intelligent Transportation Systems (ITSC). Oct. 16, 2017:1-6.

Hamid et al., Stereo matching algorithm based on deep learning: A survey. Journal of King Saud University: Computer and Information Sciences. Aug. 28, 2020:1-11.

Hinzmann et al., Flexible stereo: Constrained, non-rigid, wide-baseline stereo vision for fixed-wing aerial platforms. 2018 IEEE International Conference on Robotics and Automation (ICRA) May 21, 2018:2550-7.

Hirschmüller et al., Evaluation of cost functions for stereo matching. 2007 IEEE Conference on Computer Vision and Pattern Recognition. Jun. 17, 2007:1-8.

Hirschmüller, Stereo processing by semiglobal matching and mutual information. IEEE Transactions on Pattern Analysis and Machine Intelligence. Dec. 18, 2007;30(2):328-41.

(56) References Cited

OTHER PUBLICATIONS

Hsu et al., Online Recalibration of a Camera and Lidar System. 2018 IEEE International Conference on Systems, Man, and Cybernetics (SMC). Oct. 7, 2018:4053-8.
Hu et al., A quantitative evaluation of confidence measures for stereo vision. IEEE Transactions on Pattern Analysis and Machine Intelligence. Jan. 31, 2012;34(11):2121-33.
John et al., Automatic calibration and registration of lidar and stereo camera without calibration objects. 2015 IEEE International Conference on Vehicular Electronics and Safety (ICVES). Nov. 5, 2015:231-7.
Kakegawa et al., Road surface segmentation based on vertically local disparity histogram for stereo camera. International Journal of Intelligent Transportation Systems Research. May 2018;16(2):90-7.
Longuet-Higgins, A computer algorithm for reconstructing a scene from two projections. Nature. Sep. 1981;293(5828):133-5.
Nelder et al., A simplex method for function minimization. The Computer Journal. Jan. 1, 1965;7(4):308-13.
Poggi et al., On the confidence of stereo matching in a deep-learning era: a quantitative evaluation. IEEE Transactions on Pattern Analysis and Machine Intelligence. Apr. 2, 2021:1-8.
Rajaraman et al., Fully automatic, unified stereo camera and LiDAR-camera calibration. Automatic Target Recognition XXXI. Apr. 12, 2021;11729:270-277.
Rhemann et al., Fast cost-volume filtering for visual correspondence and beyond. CVPR '11: Proceedings of the 2011 IEEE Conference on Computer Vision and Pattern Recognition. Jun. 2011:3017-24.
Rosero et al., Calibration and multi-sensor fusion for on-road obstacle detection. 2017 Latin American Robotics Symposium (LARS) and 2017 Brazilian Symposium on Robotics (SBR). Nov. 8, 2017:1-6.
Sarika et al., Census filtering based stereomatching under varying radiometric conditions. Procedia Computer Science. Jan. 1, 2015;58:315-20.
Shin et al., Vision-based navigation of an unmanned surface vehicle with object detection and tracking abilities. Machine Vision and Applications. Jan. 2018;29(1):95-112.
Woo et al., Localization for autonomous driving. Handbook of Position Location: Theory, Practice, and Advances, Second Edition. Mar. 23, 2018:1051-87.
Zaarane et al., Distance measurement system for autonomous vehicles using stereo camera. Array. Mar. 1, 2020;5:100016.
Zabih et al., Non-parametric local transforms for computing visual correspondence. European Conference on Computer Vision May 2, 1994:151-158.
Zhang et al., A robust and rapid camera calibration method by one captured image. IEEE Transactions on Instrumentation and Measurement. Dec. 17, 2018;68(10):4112-21.
U.S. Appl. No. 17/693,634, filed Mar. 14, 2022, Jiang et al.
U.S. Appl. No. 17/887,588, filed Aug. 15, 2022, Jiang et al.
U.S. Appl. No. 17/867,826, filed Jul. 19, 2022, Swierczynski et al.
U.S. Appl. No. 18/449,886, filed Aug. 15, 2023, Swierczynski et al.
PCT/US2022/018132, Jun. 16, 2022, International Search Report and Written Opinion.

* cited by examiner

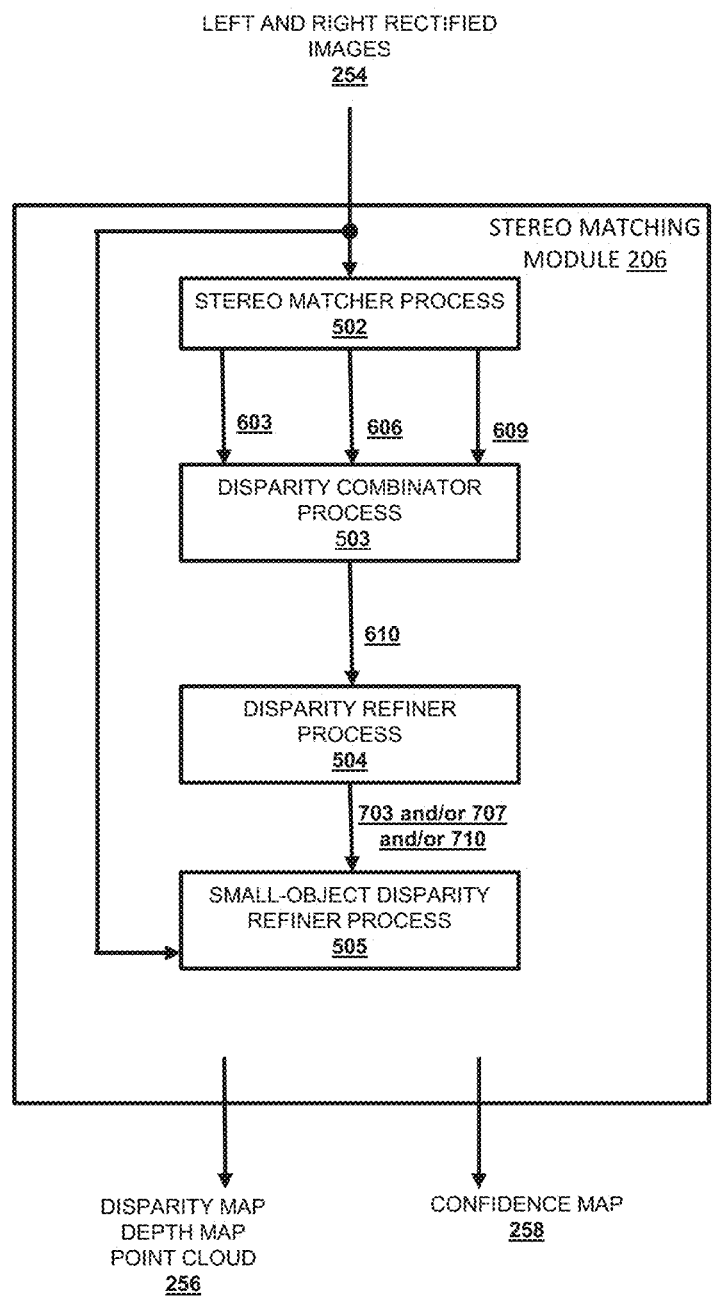

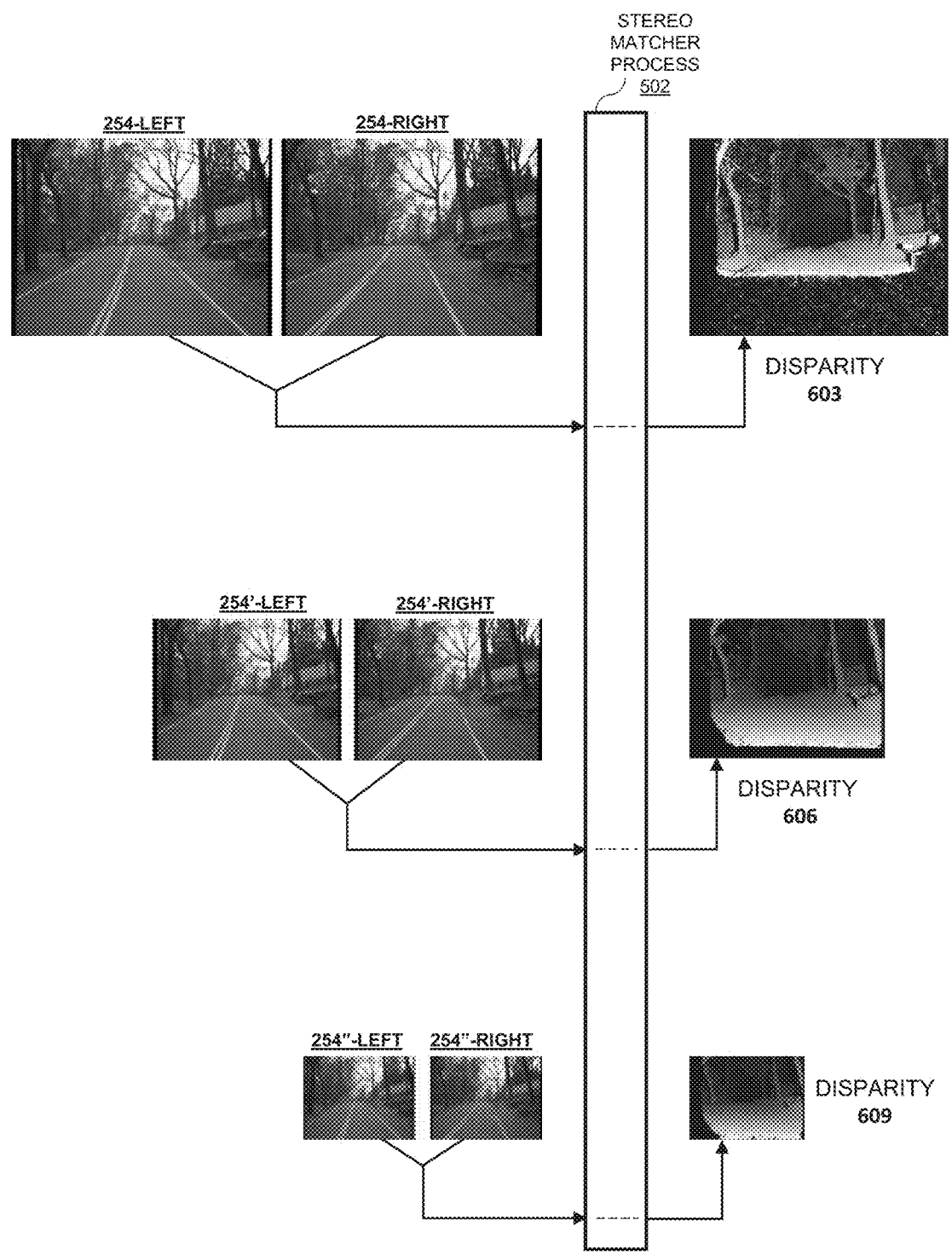

DETECTION OF NEAR-RANGE AND FAR-RANGE SMALL OBJECTS FOR AUTONOMOUS VEHICLES

CROSS REFERENCE TO RELATED APPLICATIONS

The present application is a Continuation of U.S. application Ser. No. 17/682,163, filed Feb. 28, 2022, entitled "REAL-TIME PERCEPTION SYSTEM FOR SMALL OBJECTS AT LONG RANGE FOR AUTONOMOUS VEHICLES," which claims the benefit of priority of U.S. Provisional Application No. 63/278,758 filed Nov. 12, 2021, entitled "REAL-TIME PERCEPTION SYSTEM FOR SMALL OBJECTS AT LONG RANGE FOR AUTONOMOUS VEHICLES" and also claims the benefit of priority of U.S. Provisional Application No. 63/253,772 filed Oct. 8, 2021, entitled "REAL-TIME STEREO MATCHING METHOD FOR AUTONOMOUS VEHICLES." The entire contents of each of these earlier-filed applications is incorporated by reference herein.

FIELD OF THE INVENTION

The technology of the present invention relates to perception systems for supervised or unsupervised operation of autonomous vehicles (e.g., cargo transport vehicles such as trucks, tractor trailers, and the like; and passenger vehicles such as sedans, mini-vans, sport-utility vehicles, and the like). In particular, the present technology relates to a long-baseline, long-range vision system that uses stereo-vision technology and other imaging technologies to capture images of a scene and to detect objects at near-range distances as well as far-range distances in real time and at a high resolution. In some implementations, the vision system may perform near-range and far-range detection of objects even in the presence of vibration and shock. The techniques employed by the vision system and the perception systems of the present technology may be applicable to machines that do not require human intervention, such as robots and autonomous vehicles.

BACKGROUND

Conventional detection technologies for sensing distance or depth typically employ sensors that actively measure distance to objects in an environment sensed by the sensors. Such technologies include, for example, lidar (light detection and ranging), radar (radio detection and ranging), and stereo vision.

Stereo vision systems enable three-dimensional (3D) information of a scene to be obtained from two-dimensional (2D) images of the scene taken at different vantage points. Because of their capability to provide depth information (i.e., information on distances to objects in the scene), stereo vision systems have been applied to robotics and autonomous driving, where there may be little or no human involvement. Limited depth range, however, can pose a problem with conventional systems. Stereo vision systems typically use two cameras (e.g., left and right cameras) to estimate depth or distance by measuring a disparity or parallax between matching pixels in a digital image captured by the left camera and a digital image captured by the right camera. For example, U.S. Pat. No. 8,208,716B2 discloses a stereo vision system and method that outputs a disparity map, which is a 2D matrix that contains pixel-shift data corresponding to a rectified image captured by one of the cameras (often the left camera). An estimate of depth for each pixel of the image, corresponding to a distance from the camera to an object imaged in the pixel, may be easily computed from the disparity map because the depth of the pixel is inversely proportional to the disparity of the pixel. As such, the terms "depth map" and "disparity map" may be used interchangeably herein, because they provide nearly identical information about the scene of the image. It is known that, for each pixel of an image (e.g., the left image), depth may be computed from the disparity according to expression (1):

$$D = \frac{f \times b}{d}, \tag{1}$$

where D is the distance to the scene (e.g., the distance to an object in the pixel), f is the focal length of the camera (e.g., the left camera), b is the baseline or distance between the two cameras, and d is the disparity at the pixel between the two cameras.

A stereo vision system's baseline may strongly influence a depth-detection range for the stereo vision system, for a given disparity range and a given focal length. Typical stereo vision systems have short baselines (<0.2 meter) because of mechanical restrictions and/or calibration restrictions. As will be appreciated, mounting the two cameras on a rigid structural member may help to maintain a fixed or nearly fixed relative position of the cameras, which may minimize the need for position adjustments and/or calibration of the two cameras relative to each other. A long-baseline stereo vision system, such as one having a baseline on the order of 1 meter or greater, may significantly extend the upper bound of the depth-detection range to hundreds of meters. However, conventional stereo-matching algorithms typically search in a fixed disparity search-range to limit computing time. The computing time may be further limited if high-resolution images are used. Therefore, although a long-baseline stereo vision system may be used to detect objects at great distances from the cameras, practically speaking the amount of computing required to process data at nearby distances close to the cameras up to the great distances permitted by the long baseline may be too much to be practically feasible. That is, real-time detection of objects near to and far from a moving vehicle may be too computationally onerous to be achievable with conventional computer processors used in autonomous vehicles. Stated differently, a concern with the use of a long baseline for the cameras of a conventional stereo vision system is that as the maximum disparity to be searched is increased, a minimum depth the stereo vision system can detect may also increase. That is, it may not be possible to readily and reliably detect near-range objects that are at a relatively close distance to the cameras. A long-baseline stereo vision having a limited disparity search-range may have a minimum detectable depth that can be rather large. For example, for a stereo vision system with a baseline of 1 meter and a focal length of 4,000 pixels, a minimum detectable depth may be approximately 16 meter for a disparity search-range of 0 to 255 pixels, which may result in a depth map that would not have useful information for near-range objects.

SUMMARY

The inventors of the technology described herein have recognized a need for a perception system for an autonomous vehicle, in which the perception system is able to perform real-time detection or nearly real-time detection of far-range objects, which are objects located at a relatively long distance from the vehicle, and near-range objects, which are objects located at a relatively close distance from the vehicle. The inventors have developed techniques that, in some aspects, use stereo-matching techniques and pipeline processing techniques to generate, in real time or nearly real time, depth maps for images obtained by a pair of cameras of a long-baseline stereo vision system. The depth maps may cover a large range of depths and may significantly reduce near-range dead zones or regions where detection is unreliable. Such depth maps may be generated in real time or near real time, and may be used to detect small objects (e.g., a brick, a motorcycle helmet, a segment of torn tire tread, etc.) located at relatively close depths or distances to the vehicle as well as small objects located at relatively far depths or distances from the vehicle. The ability to detect small objects located at a wide range of depths and in real time or near real time may be particularly advantageous for autonomous navigation of machines such as autonomous robots, autonomous vehicles, and the like.

According to an aspect of the present technology, a small-object perception system is provided. The system may be used in a vehicle. The system may be comprised of: a stereo vision system configured to capture stereo images and to output information identifying an object having a dimension in a range of about 100 cm to about 20 cm in a perception range of approximately 3 meters to at least approximately 150 meters from the vehicle (e.g., 5 meters to 100 meters, or 3 meters to 125 meters, or 4 meters to 150 meters); and a system controller configured to receive output signals from the stereo vision system and to provide control signals to control a path of movement of the vehicle.

In some embodiments of this aspect, the stereo vision system may be comprised of at least one pair of cameras separated by a baseline in a range of about 1 meter to about 4 meters.

In some embodiments of this aspect, the stereo vision system may be comprised of a computer processing system that includes at least one computer processor and a memory operably connected to the at least one computer processor, and the computer processing system may be comprised of a stereo matching module configured to perform stereo matching on a pair of stereo images comprised of left and right initial images and to output a final disparity map based on a plurality of preliminary disparity maps of different resolutions, generated from the left and right initial images.

In an embodiment, the preliminary disparity maps may be comprised of: a level-zero disparity map having a resolution of the pair of stereo images, a level-one disparity map having a first resolution that is lower than the resolution of the pair of stereo images, and a level-two disparity map having a second resolution that is lower than the first resolution.

In an embodiment, the level-zero disparity map provides disparity information for at least a far-distance region of the final disparity map, the far-distance region including a distance of approximately 150 meters from the vehicle (e.g., 100 meters to 200 meters, or 100 meters to 175 meters, or 75 meters to 150 meters, or 80 meters to 160 meters), the level-two disparity map provides disparity information for at least a near-distance region of the final disparity map, the near-distance region including a distance of approximately 3 meters from the vehicle (e.g., 2 meters to 60 meters, or 3 meters to 50 meters, or 3 meters to 40 meters), and the level-one disparity map provides disparity information for at least an intermediate-distance region of the final disparity map, the intermediate distance including a distance of approximately 75 meters from the vehicle (e.g., 50 meters to 100 meters, or 40 meters to 80 meters, or 30 meters to 90 meters). It should be understood that the ranges for the near-distance, intermediate-distance, and far-distance regions may be larger or smaller than those in the examples provided herein. Also, depending on the perception requirements of a particular application, the full distance range of the disparity map may be different from the range of 3 meters to 150 meters. In some embodiments where near-distance object detection at a distance of 3 meters is not necessary, the full distance range of the disparity map may be from approximately 5 meters (or 10 meters or 150 meters, etc.) to approximately 150 meters, with the ranges for the near-distance, intermediate-distance, and far-distance regions being sub-ranges of the full distance range. In some embodiments where far-distance object detection at a distance of 150 meters is not necessary, the full distance range of the disparity map may be from approximately 3 meters to approximately 100 meters (or 110 meters or 120 meters, etc.), with the ranges for the near-distance, intermediate-distance, and far-distance regions being sub-ranges of the full distance range.

In an embodiment, the stereo matching module may be configured to: combine the preliminary disparity maps into a combined disparity map, and refine the combined disparity map by: reducing noise in the combined disparity map to produce a first refined disparity map, or reducing a size of one or more invalid regions in the combined disparity map to produce a second refined disparity map, or reducing the noise and the size of one or more invalid regions in the combined disparity map to produce a third refined disparity map.

In an embodiment, the stereo matching module may be configured to detect a small object using left and right images used to produce any one of: the final disparity map, the first refined disparity map, the second refined disparity map, and the third refined disparity map, or used to produce any one of the preliminary disparity maps, by: segmenting each of the left and right images or a portion of each of the left and right images to produce left and right super-pixel images, performing stereo matching on the left and right super-pixel images to produce a super-pixel disparity map, and identifying the object based on at least one super-pixel of the super-pixel disparity map.

In an embodiment, the stereo matching may be performed on the left and right super-pixel images based on any one or any combination of: a color contrast of one or more super-pixels of the left and right super-pixel images, a shape of one or more super-pixels of the left and right super-pixel images, a size of one or more super-pixels of the left and right super-pixel images, and an orientation of one or more super-pixels of the left and right super-pixel images.

In an embodiment, the object may be identified based on any one or any combination of: a disparity of the at least one super-pixel of the super-pixel disparity map, a color contrast of the at least one super-pixel of the super-pixel disparity map, a shape of the at least one super-pixel of the super-pixel disparity map, a size of the at least one super-pixel of the super-pixel disparity map, and an orientation of one or more super-pixels of the super-pixel disparity map.

In an embodiment, the stereo matching module may be configured to reduce the noise in the combined disparity map by replacing an invalid disparity value of a pixel of a lower-level disparity map with a valid disparity value of a corresponding pixel of a higher-level disparity map.

In an embodiment, the stereo matching module may be configured to reduce the size of one or more invalid regions of the combined disparity map by replacing invalid disparity values of a portion of an invalid region of a lower-level disparity map with a valid disparity values of a corresponding portion of a higher-level disparity map.

According to another aspect of the present technology, a method of a small-object perception system is provided. The system may be used in a vehicle. The method may be comprised of: obtaining stereo images captured by a stereo vision system; generating, by at least one computer processor, perception information from the stereo images, the perception information including information identifying an object having a dimension in a range of about 100 cm to about 20 cm in a perception range of approximately 3 meters to at least approximately 150 meters from the vehicle (e.g., 5 meters to 100 meters, or 3 meters to 125 meters, or 4 meters to 150 meters); and outputting the perception information to a system controller configured to use the perception information to provide control signals to control a path of movement of the vehicle, wherein the stereo images are captured by a pair of cameras separated by a baseline in a range of about 1 meter to about 4 meters.

In some embodiments of this aspect, the stereo images may be comprised of left and right initial images, and the generating of the perception information may be comprised of: performing stereo matching on the left and right initial images, generating a plurality of preliminary disparity maps from the left and right initial images, the preliminary disparity maps having different resolutions from each other, and outputting a final disparity map based on the preliminary disparity maps.

In an embodiment, the preliminary disparity maps may be comprised of: a level-zero disparity map having a resolution of the stereo images, a level-one disparity map having a first resolution that is lower than the resolution of the stereo images, and a level-two disparity map having a second resolution that is lower than the first resolution. The level-zero disparity map may provide disparity information for at least a far-distance region of the final disparity map, the far-distance region including a distance of approximately 150 meters from the vehicle (e.g., 100 meters to 200 meters, or 100 meters to 175 meters, or 75 meters to 150 meters, or 80 meters to 160 meters). The level-two disparity map may provide disparity information for at least a near-distance region of the final disparity map, the near-distance region including a distance of approximately 3 meters from the vehicle (e.g., 2 meters to 60 meters, or 3 meters to 50 meters, or 3 meters to 40 meters). The level-one disparity map may provide disparity information for at least an intermediate-distance region of the final disparity map, the intermediate distance including a distance of approximately 75 meters from the vehicle (e.g., 50 meters to 100 meters, or 40 meters to 80 meters, or 30 meters to 90 meters).

In an embodiment, the generating of the perception information may be comprised of: combining the preliminary disparity maps into a combined disparity map, and refining the combined disparity map by: reducing noise in the combined disparity map to produce a first refined disparity map, or reducing a size of one or more invalid regions in the combined disparity map to produce a second refined disparity map, or reducing the noise and the size of one or more invalid regions in the combined disparity map to produce a third refined disparity map.

In an embodiment, the generating of the perception information may be comprised of detecting a small object using left and right images used to produce any one of: the final disparity map, the first refined disparity map, the second refined disparity map, and the third refined disparity map, or used to produce any one of the preliminary disparity maps, by: segmenting each of the left and right images or a portion of each of the left and right images to produce left and right super-pixel images, performing stereo matching on the left and right super-pixel images to produce a super-pixel disparity map, and identifying the object based on at least one super-pixel of the super-pixel disparity map.

In an embodiment, the performing of the stereo matching may be based on any one or any combination of: a color contrast of one or more super-pixels of the left and right super-pixel images, a shape of one or more super-pixels of the left and right super-pixel images, a size of one or more super-pixels of the left and right super-pixel images, and an orientation of one or more super-pixels of the left and right super-pixel images.

In an embodiment, the identifying of the object may be based on any one or any combination of: a disparity of the at least one super-pixel of the super-pixel disparity map, a color contrast of the at least one super-pixel of the super-pixel disparity map, a shape of the at least one super-pixel of the super-pixel disparity map, a size of the at least one super-pixel of the super-pixel disparity map, and an orientation of one or more super-pixels of the super-pixel disparity map.

In an embodiment, the reducing of the noise in the combined disparity map may be comprised of replacing an invalid disparity value of a pixel of a lower-level disparity map with a valid disparity value of a corresponding pixel of a higher-level disparity map.

In an embodiment, the reducing of the size of one or more invalid regions of the combined disparity map may be comprised of replacing invalid disparity values of a portion of an invalid region of a lower-level disparity map with a valid disparity values of a corresponding portion of a higher-level disparity map.

According to another aspect of the present technology, a non-transitory computer-readable storage medium is provided in which is stored code that, when executed by a computer system comprised of at least one computer processor, causes the computer system to perform a method of a small-object perception system. The method may be comprised of: obtaining stereo images captured by a stereo vision system; generating perception information from the stereo images, the perception information including information identifying an object having a dimension in a range of about 100 cm to about 20 cm in a perception range of approximately 3 meters to at least approximately 150 meters from the vehicle (e.g., 5 meters to 100 meters, or 3 meters to 125 meters, or 4 meters to 150 meters); and outputting the perception information to a system controller configured to use the perception information to provide control signals to control a path of movement of the vehicle. The stereo images may be captured by a pair of cameras separated by a baseline in a range of about 1 meter to about 4 meters.

In some embodiments of this aspect, the stereo images may be comprised of left and right initial images, and the generating of the perception information may be comprised of: performing stereo matching on the left and right initial images, generating a plurality of preliminary disparity maps from the left and right initial images, the preliminary disparity maps having different resolutions from each other, and outputting a final disparity map based on the preliminary disparity maps.

In an embodiment, the preliminary disparity maps may be comprised of: a level-zero disparity map having a resolution of the stereo images, a level-one disparity map having a first resolution that is lower than the resolution of the stereo images, and a level-two disparity map having a second resolution that is lower than the first resolution. The level-zero disparity map may provide disparity information for at least a far-distance region of the final disparity map, the far-distance region including a distance of approximately 150 meters from the vehicle (e.g., 100 meters to 200 meters, or 100 meters to 175 meters, or 75 meters to 150 meters, or 80 meters to 160 meters). The level-two disparity map may provide disparity information for at least a near-distance region of the final disparity map, the near-distance region including a distance of approximately 3 meters from the vehicle (e.g., 2 meters to 60 meters, or 3 meters to 50 meters, or 3 meters to 40 meters). The level-one disparity map may provide disparity information for at least an intermediate-distance region of the final disparity map, the intermediate distance including a distance of approximately 75 meters from the vehicle (e.g., 50 meters to 100 meters, or 40 meters to 80 meters, or 30 meters to 90 meters).

In an embodiment, the generating of the perception information may be comprised of: combining the preliminary disparity maps into a combined disparity map, and refining the combined disparity map by: reducing noise in the combined disparity map to produce a first refined disparity map, or reducing a size of one or more invalid regions in the combined disparity map to produce a second refined disparity map, or reducing the noise and the size of one or more invalid regions in the combined disparity map to produce a third refined disparity map.

In an embodiment, the generating of the perception information may be comprised of detecting a small object using left and right images used to produce any one of: the final disparity map, the first refined disparity map, the second refined disparity map, and the third refined disparity map, or used to produce any one of the preliminary disparity maps, by: segmenting each of the left and right images or a portion of each of the left and right images to produce left and right super-pixel images, performing stereo matching on the left and right super-pixel images to produce a super-pixel disparity map, and identifying the object based on at least one super-pixel of the super-pixel disparity map.

In an embodiment, the performing of the stereo matching may be based on any one or any combination of: a color contrast of one or more super-pixels of the left and right super-pixel images, a shape of one or more super-pixels of the left and right super-pixel images, a size of one or more super-pixels of the left and right super-pixel images, and an orientation of one or more super-pixels of the left and right super-pixel images.

In an embodiment, the identifying of the object may be based on any one or any combination of: a disparity of the at least one super-pixel of the super-pixel disparity map, a color contrast of the at least one super-pixel of the super-pixel disparity map, a shape of the at least one super-pixel of the super-pixel disparity map, a size of the at least one super-pixel of the super-pixel disparity map, and an orientation of one or more super-pixels of the super-pixel disparity map.

In an embodiment, the reducing of the noise in the combined disparity map may be comprised of replacing an invalid disparity value of a pixel of a lower-level disparity map with a valid disparity value of a corresponding pixel of a higher-level disparity map.

In an embodiment, the reducing of the size of one or more invalid regions of the combined disparity map may be comprised of replacing invalid disparity values of a portion of an invalid region of a lower-level disparity map with a valid disparity values of a corresponding portion of a higher-level disparity map.

The foregoing features may be used, separately or together in any combination, in any of the embodiments discussed herein.

BRIEF DESCRIPTION OF DRAWINGS

The present patent or patent application file contains at least one drawing executed in color. Copies of this patent or patent application publication with color drawings will be provided by the Office upon request and payment of the necessary fee.

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

FIG. 5A shows a block diagram of a stereo matching module, according to some embodiments of the present technology, and FIG. 5B shows a procedure of a stereo-matcher processing submodule of the stereo matching module, according to some embodiments of the present technology. Portions of FIG. 5B are in color.

DETAILED DESCRIPTION

Figure 1:
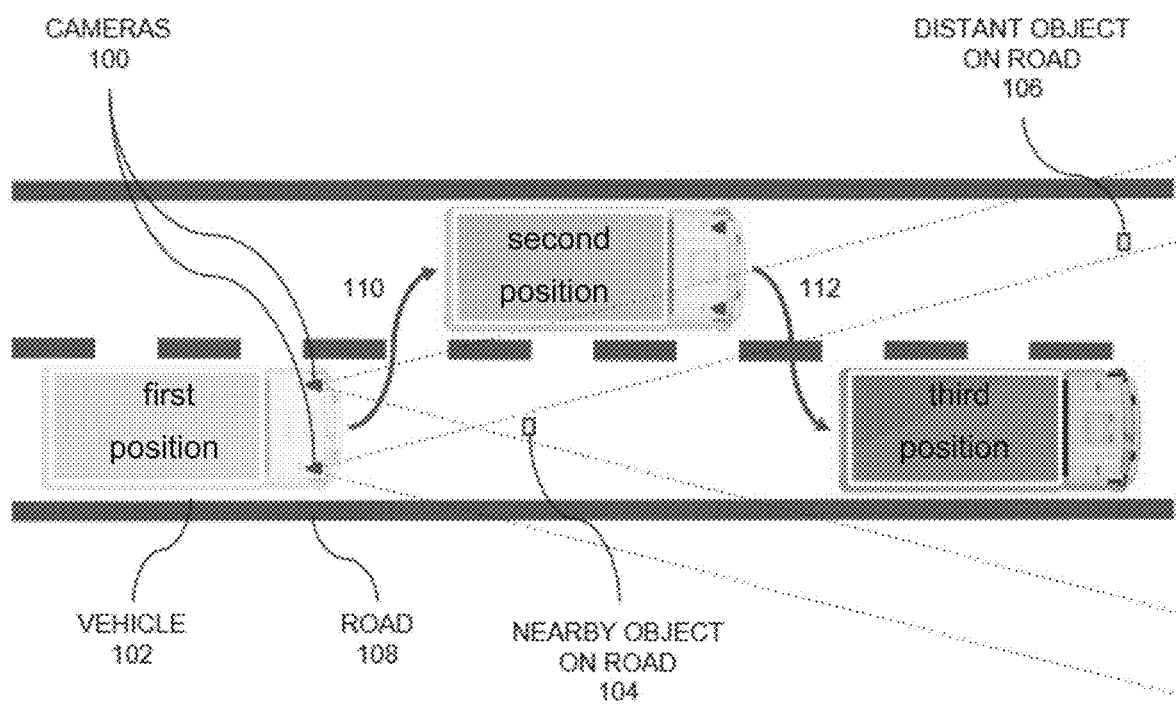
FIG. 1 schematically shows an environment in which a perception system may be used, according to some embodiments of the present technology.

The inventors of the present technology disclosed herein have recognized a need for a perception system that is able to detect objects near to and far from a moving autonomous vehicle on which the perception system is installed, in order to control the vehicle to move safely along a route to a desired destination. The autonomous vehicle may be, e.g., a passenger car, a sport-utility vehicle (SUV), a light truck, a tractor trailer, etc. The ability to detect objects far from the vehicle may enable sufficient time for a controller to determine a safe path of movement along a segment of the route, such that there is, e.g., minimal speed variations and a shortest time to complete the segment. The ability to detect objects near to the vehicle may enable the controller to make quick decisions to maneuver the vehicle safely to avoid hitting the object.

For example, a small object such as a brick, a muffler, a wooden pallet, a motorcycle helmet, a traffic cone, a portion of tire tread, a pothole, and the like, may pose a hazard when located on a highway on which the vehicle is travelling. At typical highway speeds, if the small object is able to be detected at a long-range distance of about 150 meters or more, the vehicle may have around 5 seconds or more to switch lanes, or to apply emergency brakes, or to perform another evasive maneuver, which may be sufficient time to avoid coming into contact with the object. If the vehicle is a fully loaded truck, which can have a weight of about 80,000 lbs., the vehicle may need almost 60 seconds to accelerate/decelerate to merge safely into another lane at highway speeds, and may need to see backwards in a neighboring lane, for 300 meters or more, for oncoming vehicular traffic.

The inventors of the present technology have recognized the benefits of a perception system that is mountable on a vehicle and that has a sufficient angular resolution, a sufficient lateral range, and a sufficient depth or distance range, to enable the perception system to sense small objects at long-range distances. The inventors have developed a vehicle-mountable perception system for an autonomous vehicle that has an angular resolution sufficient to sense an object that is about 100 cm or about 80 cm or about 60 cm or about 40 cm or about 20 cm in length or diameter at a distance of 150 meters. In some embodiments, the perception system may be used to detect the greater that 150 meters away at a sufficient area cover rate, or greater than 200 meters away, or even greater than 250 meters away, thus enhancing the safety of the vehicle by enabling sufficient time for the vehicle to be electronically controlled to perform evasive maneuvers safely.

A typical autonomous vehicle may utilize signals from multiple sensors comprised of different types of sensors. The different types of sensors may be selected to complement each other, such that a weakness of one type of sensor may not be a weakness of another type of sensor. For example, the different types of sensors may include radar, lidar, and camera sensors. A radar sensor system may not provide a sufficiently high angular resolution for automotive-related sensing, a lidar sensor system may not provide a sufficiently high lateral range or area coverage rate for automotive-related sensing, and a camera sensor system may not provide sufficient depth information for automotive-related sensing.

The inventors have developed a perception system that performs depth sensing using multiple cameras, which are configured to provide a sufficiently high angular resolution for automotive-related sensing, a sufficiently high lateral range or area coverage rate for automotive-related sensing, and sufficient depth information for automotive-related sensing. In some embodiments of the present technology, the perception system may be comprised of only one type of sensor: cameras. In some embodiments, the perception system may be comprised of a camera system that includes one pair or a plurality of pairs of stereo cameras. In some embodiments, the perception system may be comprised of the camera system and one or both of: a lidar sensor system and a radar sensor system.

The inventors have developed a perception system that makes inferences about properties and conditions of a physical environment based on sensor measurements. In some embodiments, the perception system may be comprised of a sensor system that includes a combination of cameras, lidar sensors, and radar sensors mounted on an autonomous vehicle to understand a current environment of the vehicle as well as an upcoming environment of the vehicle, to determine the vehicle's location along the route to the desired destination and also to avoid detected objects along the route. The perception system also may be comprised of one or more modules that operate in conjunction with the sensor system to obtain and process sensor data and to output signals for controlling the vehicle. As discussed below, the modules may include any one or any combination of an object detection module, a lane detection module, a semantic segmentation module, and a localization module. The one or more modules may be implemented by software code executed on one or more computer processors and/or by hardware. In some embodiments, the software code may be stored on at least one non-transitory computer-readable storage medium accessible by the one or more computer processors. In some embodiments, the software code may be pre-programmed in the hardware.

Safe operation of autonomous vehicles (e.g., trucks, passenger vehicles, etc.) may rely on depth information from perception systems to navigate safely in their environments. A perception system that senses depths over a large depth range may be used advantageously to perceive objects near and far, as discussed above. For example, an autonomous vehicle, also referred to as an "ego" vehicle herein, may use depth-sensing technology of an on-board perception system to perceive objects and other navigational information in a 3D environment in which the ego vehicle is travelling. The perception system may perform perception tasks that include, but are not limited to, object detection, lane detection, semantic segmentation, and localization. Object detection may, for example, entail identifying a type of an object in an image (e.g., a cat, a rock, a brick, etc.), its pose, and a bounding box. Lane detection may, for example, entail identifying, in an image, left and right boundaries of a lane in which the ego vehicle is travelling and optionally may also entail identifying boundaries of neighboring lanes. Semantic segmentation may, for example, entail categorizing each pixel of an image as one or another of a list of different categories (e.g., sky, rock, tree, water, grass, cloud, dog, etc.). Localization may, for example, entail computing the ego vehicle's position relative to its surroundings. The perception system may couple information obtained from such perception tasks to depth information calculated from stereo images to determine, e.g., how quickly action must be taken to avoid hitting an object and/or what type of action(s) can be taken to avoid hitting the object.

As will be appreciated, fast and accurate determination of depth over a wide range of depths is important to perceiving objects near and far relative to a moving vehicle. For an ego vehicle travelling at 100 kilometers per hour (or about 30 meters per second) on a highway, an ability to perceive objects and road boundaries at or beyond a minimum distance of 100 meters is desirable in order to have sufficient reaction time to plan for and move to a safer path and avoid obstacles. For large-sized trucks and/or heavier vehicles, this minimum distance should be much larger to account for the relatively larger stopping distance of large-sized trucks and/or heavier vehicles relative to, e.g., a sedan, due to, e.g., momentum-related considerations. For a truck traveling at legally allowed high speeds on a highway, the truck may need to perceive objects at or beyond a minimum distance of about 200 meters to be able to come to a complete stop. Under adverse road conditions (e.g., snow, ice, rain), this stopping distance may need to be even longer. Thus, a perception system that is able to sense objects at depths of at least 200 meters or more relative to a vehicle moving at typical highway speeds is highly desirable for enabling safe operation of the vehicle. On the other hand, for areas that may be densely populated (e.g., urban cities, downtown sections of rural towns, shopping plazas, etc.) an ego vehicle may travel at a relatively low speed but may need to react particularly quickly to nearby objects, which may appear suddenly (e.g., a runaway shopping cart, a cyclist or a pedestrian not obeying right-of-way rules, etc.) and may be very close to the vehicle (e.g., three meters or less). Thus, a perception system that is able to sense objects at short depths of a few meters or less is highly desirable.

The inventors of the present technology disclosed herein have recognized a need for a long-baseline stereo vision system able to detect far-range objects that are at a relatively long distance from the cameras of the system and also able to detect near-range objects that are at a relatively close distance from the cameras. The inventors have developed real-time or nearly real-time stereo-matching techniques that use one or more pipelines to generate depth maps for stereo images obtained by a pair of cameras of a long-baseline stereo vision system. The depth maps may cover a large range of depths and may significantly reduce near-range dead zones or regions where detection is unreliable. The stereo-matching techniques disclosed herein may enable depth maps to be generated efficiently, in real time, without sacrificing detection accuracy over a large range of depths. Included in the stereo-matching techniques disclosed herein are depth-map refinement techniques that may be used to reduce noise and/or to eliminate or reduce the size of invalid regions. Additionally, the disclosed stereo-matching techniques include a technique that may be used to detect small far-range objects as well as small near-range objects, which may be particularly useful for autonomous navigation of machines such as autonomous robots, autonomous vehicles, and the like.

In some embodiments of the present technology, pyramidal searching techniques may be used to reduce the number of computational operations to be performed. In conventional pyramidal searching, such as described in U.S. Pat. No. 8,971,634 ("Barnum"), high-resolution images undergo a coarse filtering operation to reduce the computational burden posed by stereo-matching algorithms. The coarse filtering results in low-resolution images, which are the images used in stereo-matching processing. For example, a convolution filter may be used to reduce the number of pixels to be searched to half the number of pixels of the high-resolution images and therefore may significantly reduce computation time. The inventors have recognized and appreciated that stereo matching algorithms can use a reduced disparity search range for pyramid images, because searching in a reduced range of pixels r on lower-resolution images of a pyramid level i+1 can achieve the same effect as searching in a range of pixels 2×r on finer-resolution images of a pyramid level i. In some embodiments, by performing multi-level pyramidal searching of original images of very high resolution, the computational burden of stereo-matching processing may be reduced for images captured by long-baseline, high-resolution stereo vision systems, such that near-range detection as well as far-range detection is possible with reasonable levels of detail sufficient to detect small objects having a dimension of about 100 cm or about 80 cm or about 60 cm or about 40 cm or about 20 cm (e.g., a ball having a diameter of about 20 cm). Thus, high-quality depth maps with an expanded depth range may be produced in real time or near real time via multi-level pyramidal searching.

Speckles or noisy portions are often observed in disparity maps produced by conventional stereo matching techniques. Speckles may be small, localized regions and may be scattered across an entire disparity map corresponding to an image frame. Speckles may be generated by stereo-matching algorithms when invalid matches occur. In some embodiments of the present technology, disparity maps may be produced that have a reduced amount of speckles compared with disparity maps produced conventionally. The reduction in speckles may enable a denser disparity map and therefore may enable finer details of the scene to be discerned. For example, by reducing the amount of speckless, smaller objects that would not have been observed due to typical noise in a conventional disparity map, may be discerned with reasonable reliability as an object in the scene, in some embodiments of the technology disclosed herein. Although stereo matching at the pixel level may not adequately resolve a distant pixel-sized object, the reduction in disparity-map noise may increase the ability to detect smaller objects. This ability is of particular importance for autonomous navigation of robots, vehicles, and other machines, where early detection of the presence of potential hazards, which may be small, may enable smoother and safer navigation of the machines to avoid the potential hazards. For example, such early detection may provide additional time for an autonomous vehicle on a multi-lane highway to make a gradual or smooth lane change to avoid detected debris ahead in the current lane.

The discussion below uses an autonomous vehicle as an example of one type of machine that may employ various aspects of the present technology. It should be understood that the present technology is not limited to use with autonomous vehicles but may be used in other machines and other systems where stereo vision is used to capture images of a scene to detect near-range objects and far-range objects in the scene. For example, various aspects of the present technology may be used in an early-warning system and/or a driver-assist system of a piloted vehicle (i.e., a vehicle controlled by a human operator).

High-resolution images may be captured by various types of sensor systems (e.g., a lidar system, a radar system, a mono-vision camera system, a stereo-vision camera system, etc.) and may be used by a vehicle to obtain information about the vehicle's surroundings while the vehicle is in motion, to enable the vehicle's electronic control system to make decisions about how to operate the vehicle and/or to provide useful information for a driver to assist the driver in operating the vehicle. For example, sensor information may be used by the electronic control system to adjust the vehicle's speed (e.g., accelerate or decelerate), to deploy safety measures (e.g., turn on warning flashers, windshield wipers, etc.), to steer away from an object in the vehicle's path, etc. In another example, sensor information may be used by the electronic control system to warn the driver of a specific object in the vehicle's path.

In some embodiments of the present technology, the electronic control system may be a centralized computer system comprised of ECUs configured to control various aspects of operation of the vehicle. Each of the ECUs may be comprised of software and/or hardware configured to receive data from one or more sensors and to process the data to output one or more control signals used to operate part of the vehicle. A vehicle may have, in some instances, over one hundred ECUs in operation at a given time while the vehicle is moving. Some ECUs may operate independently of other ECUs, and some ECUs may operate interdependently with one or more other ECUs.

In some other embodiments of the present technology, the vehicle's electronic control system may be decentralized. For example, a battery management ECU may operate as a separate system that is independent of, e.g., a speed control ECU. Each ECU may receive sensor information from one type of sensor or a plurality of types of sensors. For example, a cabin-temperature ECU may receive sensor information from one or more thermometers located at different regions of the cabin of the vehicle, and may use the sensor information to control a heater and/or an air conditioner to maintain the temperature of the cabin to a temperature set by an occupant of the vehicle. In another example, a steering ECU may receive sensor information and other information from various combinations of one or more sets of cameras for stereo imaging, one or more radar systems, one or more lidar systems, one or more tire-pressure gauges, one or more microphones, one or more cameras for 2D imaging, and one or more navigation systems (e.g., GPS systems), and may use the information to determine the best course of action to steer the vehicle safely to a destination.

The inventors have recognized and appreciated that safe operation of an autonomous vehicle may rely heavily on the ability of a stereo vision system to produce accurate and disparity maps in real time, because the disparity maps may be used to detect the presence of objects. According to some embodiments of the present technology, a stereo vision system may produce disparity maps that enable detection of small objects as well as large objects, and the detected objects may be near-range objects, which are relatively close to the vehicle, and far-range objects, which are relatively far from the vehicle.

The discussion below uses a pair of cameras as one type of sensor that may be used to capture images for stereo-vision processing, according to various embodiments of the present technology. It should be understood that the present technology is not limited to using image data from cameras but may use image data from other types of sensors (e.g., lidar, radar, etc.), as noted above According to some embodiments of the present technology, a stereo vision system may be configured to output a depth map corresponding to a pair of images (also referred to as stereo images) captured of a scene. Each image may be a digital image as captured or may be digitized from an analog image. The depth map may be a map of depth values or distances from a pair of cameras of the stereo vision system to objects in the scene. The depth map may be comprised of pixels corresponding to pixels of the image, such that each pixel of the depth map (and each pixel of the image) may have an associated depth value. The stereo vision system also may be configured to output confidence data together with the depth map according to techniques developed by L. Jiang et al., as described in commonly assigned U.S. patent application Ser. No. 17/559,384 entitled "METHODS AND SYSTEMS FOR PROVIDING DEPTH MAPS WITH CONFIDENCE ESTIMATES" which is hereby incorporated by reference herein in its entirety. In some embodiments, the confidence data may be a confidence map that indicates a certainty or confidence of the depth map. In some embodiments, the confidence map may be comprised of pixels corresponding to the pixels of the depth map (and the image), such that each pixel of the confidence map (and each pixel of the image) may have an associated confidence.

As noted above, an estimate of a depth for each pixel of an image may be computed from a disparity map, because the depth of the pixel is inversely proportional to the disparity of the pixel. As such, the terms "depth map" and "disparity map" may be used interchangeably herein, because they provide nearly identical information about the captured scene in the image and they are related by a simple algebraic transformation known in the art.

According to some embodiments of the present technology, an autonomous vehicle and/or an advanced driver assistance system (ADAS) may use a depth map to determine a best course of movement for the vehicle. For example, based on objects located in the path of the vehicle, as detected from the depth map, the vehicle's ADAS may automatically steer the vehicle to avoid the objects.

FIG. 1 schematically shows an environment in which a perception system 1, configured according to some embodiments of the present technology, may be used. The perception system 1, discussed in connection with FIG. 2, may be carried by an ego vehicle 102 and may operate in conjunction with two cameras 100 with overlapping fields of view. The cameras 100 may be comprised of a pair of stereo cameras mounted on the vehicle 102 to observe a region in front of the vehicle 102, such as an upcoming portion of a road 108 on which the vehicle 102 is travelling, to provide three-dimensional information. The fields of view of the cameras 100 are shown in FIG. 1 with dotted lines for an initial vehicle location. As will be appreciated, the fields of view of the cameras 100 may move together with movement of the vehicle 102. In some embodiments, the cameras 100 may be mounted such that there is a wide baseline separating the cameras 100 (e.g., at least 1.2 meters on a passenger car's roof, at least 2.4-meters on a truck's roof, at least 3 meters on left and right side-view mirrors of a truck, etc.). A wide baseline may enable precise distance measurements at long ranges of 150 meters or greater. The two cameras 100 may be connected by wire or wirelessly to the perception system 1, which may receive image data captured by the cameras 100 and may sense or detect obstacles, lanes, a drivable road surface, and the like, from the captured image data. The perception system 1 may be operatively connected to a main system controller 2 of the vehicle 102, which may use signals from the perception system 1 to control, among other things, speed and direction of the vehicle 102. In some embodiments, the perception system 1 may be configured to search for nearby, potentially hazardous, objects 104, which may be at ranges or distances less than approximately 150 meters, and to search for distant, potentially hazardous, objects 106, which may be at ranges of approximately 150 meters or greater. If one or more nearby objects 104 and/or one or more distant objects 106 are detected, the perception system 1 may send signals to enable the main controller 2 to adjust the travel trajectory or path taken by the vehicle 102 according to the detected objects. Unlike conventional stereo camera systems, which typically have a limited depth range, the depth range of the perception system 1 may span from short distances of two or three meters to large distances of 150 meters or 200 meters or more, which enables detection of nearby objects as well as distant objects along a road travelled by the vehicle 102. For example, as depicted in FIG. 1, the vehicle 102 may have a trajectory that evades the nearby obstacle 104 with a first maneuver from a first position to a second position, as depicted by a first arrow 110, and that evades a distant obstacle 106 with the second maneuver from the second position to a third position, as depicted by a second arrow 112. In this manner, a supervised or unsupervised autonomous vehicle can perceive close road hazards as well as distant road hazards and may automatically steer around the objects or, if warranted, come to a complete stop.

Figure 2:
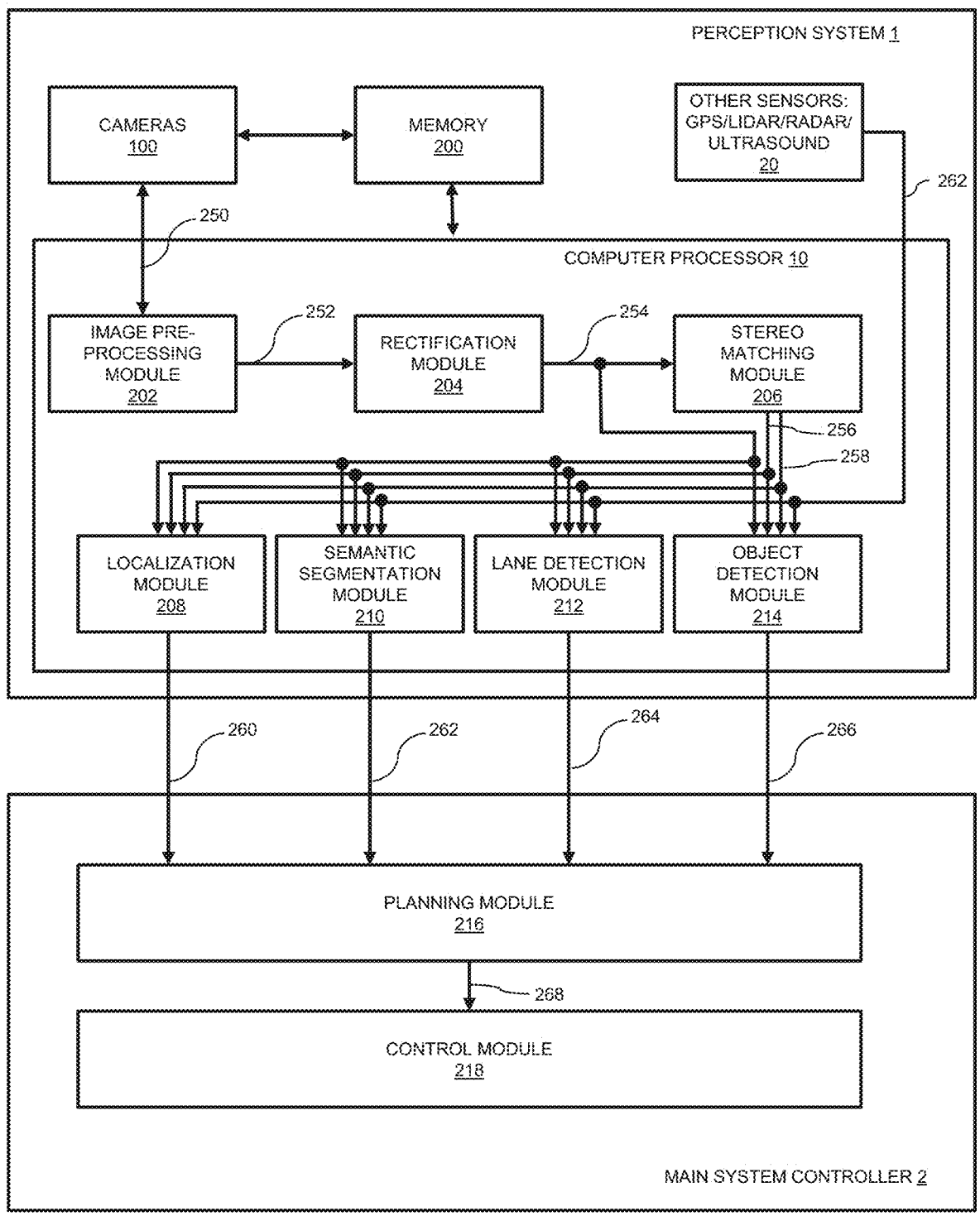
FIG. 2 shows a block diagram of a perception system and a controller used with the perception system, according to some embodiments of the present technology.

Although the perception system 1 is shown in FIG. 2 to be separate from the main system controller 2, the perception system 1 may, in some embodiments, be part of the main system controller 2 and may, in some embodiments, be physically located in a housing of the main system controller 2. In some embodiments, the main system controller 2 may be a control system of the vehicle 102, which may be configured to control all automated aspects of operation of the vehicle 102. In some embodiments, the main system controller 2 may be operatively connected, via wires or wirelessly, to multiple ECUs each configured to control different operational functions of the vehicle 102.

According to some embodiments of the present technology, the two cameras 100 may be mounted on the vehicle 102 such that there is a wide baseline separating the cameras 100. For example, the baseline may be in a range of 1 meter to 4 meters (e.g., 1.5 meters, 2 meters, 2.5 meters, 3 meters, 3.5 meters, etc.). For example, the two cameras 100 may be mounted on left and right sides of a roof of a tractor trailer and may be separated by a baseline of approximately 2 meters. In another example, the two cameras 100 may be mounted on left and right sides of a wide-load trailer and may be separated by a baseline in a range of approximately 3 meters to 4 meters (e.g., 3.5 meters). The cameras 100 may be synchronized with each other to capture stereo images of the environment ahead of the vehicle 102 simultaneously, i.e., at the same or nearly the same moment of time. The cameras 100 may be positioned horizontally relative to each other on the vehicle 102. Alternatively, the cameras 100 may be positioned vertically relative to each other, or diagonally relative to each other, or offset in different range bins (e.g., one camera is at a front portion of the vehicle 102 and the other camera is at a rear portion of the vehicle 102). The cameras 100 may be, e.g., color CMOS (complementary metal-oxide-semiconductor) cameras, grayscale CMOS cameras, CCD (charge-coupled device) cameras, SWIR (short-wave infrared) cameras, LWIR (long-wave infrared) cameras, or focal-plane array sensors.

According to some embodiments of the present technology, raw image data 250 captured by the two cameras 100 may be provided to an image pre-processing module 202 of a computer processor 10 for pre-processing. The cameras 100 may be coupled to the image pre-processing module 202 wirelessly or by a wired connection. In some embodiments, image data of a scene captured by the cameras 100 may be transferred to the image pre-processing module 202 via a known communication interface (e.g., a USB (Universal Serial Bus) connector, an Ethernet connector, a MIPI (Mobile Industry Processor Interface) connector, CSI (Camera Serial Interface) connector, GMSL (Gigabit Multimedia Serial Link) connector, Flat Panel Display Link (FPD-Link) connector, and the like). In some embodiments, the cameras 100 may be configured to transmit the image data to the image pre-processing module 202 in real time or nearly real time, directly or via a buffer memory device (e.g., RAM), which may be incorporated in the cameras 100. In some embodiments, the cameras 100 may be operative connected to a data-storage memory device 200 accessible by the image pre-processing module 202 as well as other parts of the computer processor 10, and the cameras 100 may be configured to transmit the image data to the data storage device 200. In some embodiments, the cameras 100 may be video cameras configured to capture streams of video data of the scene. The image data 250 may be two streams of video data comprised of, e.g., a left stream and a right stream, with each stream being comprised of a sequence of frames. Thus, the term "image data" as used herein may, in some embodiments, refer to frames of video data.

According to some embodiments of the present technology, the image pre-processing module 202 may be configured to correct the raw image data to produce corrected left and right images. For example, the image pre-processing module 202 may perform any one or any combination of: demosaicing; auto-focus, auto-exposure, and auto-white-balance correction; vignetting; noise reduction; bad-pixel filtering; HDR (high-dynamic-range) look-up-table color processing; and image compression. The corrected left and right images may be transferred to an image rectification module 204 of the computer processor 10.

According to some embodiments of the present technology, the image rectification module 204 may be configured to rectify the corrected left and right images by warping them so that corresponding rows of pixels of the corrected left and right images are on a same epipolar plane. After warping, the image rectification module 204 may output left and right rectified images 254, which may be color images or grayscale images. In some embodiments, the image rectification module 204 may correct for time-dependent changes in intrinsic and extrinsic camera parameters. As will be appreciated, small variations in the camera parameters of wide-baseline cameras may cause large discrepancies in a wide-baseline arrangement. The variations may result from mechanical perturbations to the cameras 100 or to structures supporting the cameras 100 and may occur on a fast time scale (e.g., frame-by-frame) as well as on a slow time scale (e.g., hours, or days). In some embodiments, the image rectification module 204 may compensate for time-dependent changes in camera parameters according to techniques developed by L. Jiang et al., as described in commonly assigned U.S. patent application Ser. No. 17/365,623 entitled "NON-RIGID STEREO VISION CAMERA SYSTEM", which is hereby incorporated by reference herein in its entirety. That is, while conventional image rectification may use a known technique that simply matches common objects in the corrected left and right images, image rectification by the image rectification module 204 may, in some embodiments, perform real-time or nearly-real-time correction of the camera parameters of the cameras 100, such that the rectified images 254 are corrected for perturbations that may affect object detection and/or depth determination nearly instantaneously. The rectified images 254 may be provided to perception modules of the computer processor 10 and to a stereo matching module 206 of the computer processor 10.

According to some embodiments of the present technology, the stereo matching module 206 may be configured to compute a disparity between each matching pixel pair in the left and right rectified images 254. The stereo matching module 206 may output a disparity map 256 and a confidence map 258. The disparity map 256 and the confidence map 258 may be generated by the stereo matching module 206 according to techniques developed by L. Jiang et al. and described in U.S. patent application Ser. No. 17/559,384 (see citation above). The confidence map 258 may be a map that indicates a level of confidence in a depth estimate for regions (e.g., each of the pixels) of the left or right image of the rectified images 254. As will be appreciated, processing performed by the stereo matching module 206 may be of particular importance because the processing yields 3D information about objects within close range of the vehicle 102 as well as objects within a far range of the vehicle 102 in real time or nearly real time, and also because subsequent processing of the rectified images 254 may depend on the 3D information output by the stereo matching module 206.

According to some embodiments of the present technology, the perception modules of the computer processor 10 may be comprised of a localization module 208, a semantic segmentation module 210, a lane detection module 212, and an object detection module 214, each of which is discussed below. Inputs to each of the perception modules may be comprised of the left and right rectified images 254, the disparity map 256, the confidence map 258, and, optionally, sensor outputs 262 from other sensors 20 on board the vehicle 102. For example, the other sensors 20 that may be operational on the vehicle 102 may include any one or any combination of: a GPS/INS (GPS-corrected inertial navigation system), an inertial measurement unit (IMU), a lidar system, a radar system, an acoustic/ultrasound sensor system, additional cameras, etc.

According to some embodiments of the present technology, the localization module 208 may be configured to estimate an orientation and a location of the vehicle 102 inside a map, typically with an error of less than 10 cm. Such precision may be particularly useful for knowing a specific location of an autonomous vehicle, so that specific locations of known structures (e.g., bridges, buildings, monuments, highway traffic signs, mountains and other natural terrain, etc.) relative to the vehicle 102 may be determined, and also so that specific locations of detected objects may be determined from their relative distances to the vehicle 102. In some embodiments, the localization module 208 may output a position and an orientation or heading of the vehicle 102. The position and the orientation may be three-dimensional quantities. Suitable localization techniques for determining position and orientation from the left and right rectified images 254 and the disparity map 256 are known in the art and therefore will not be described herein. For example, suitable localization techniques may be found in "Localization for Autonomous Driving" (A. Woo et al., chapter 29 in Handbook of Position Location: Theory, Practice, and Advances, 2019). In some embodiments, the localization module 208 may use the confidence map 258 to provide certainty estimates for the position and the orientation of the vehicle 102. As will be appreciated, with conventional depth-sensing technologies, depth information provided by conventional stereo vision, lidar, radar, and/or acoustic sensing technologies on board a vehicle typically is limited to sensing depths or distances from the vehicle of less than about 150 meters, which may be an insufficient range to determine the location of the vehicle relative to road infrastructure objects (e.g., highway overpasses, exit signs, etc.) and/or to natural features (e.g., mountains, lakes, etc.) beyond 150 meters from the vehicle. In contrast, these drawbacks may be overcome using some embodiments of the present technology. For example, in some embodiments of the present technology, the cameras 100 may be comprised of first and second cameras of a long-forward-range and long-lateral-range stereo vision system, with the first and second cameras being separated by a baseline of 1.2 meters or greater and with each of the first and second cameras having a field of view of at least 30 degrees. With such a stereo vision system mounted on the vehicle 102, robust localization of the vehicle 102 may be determined or localized relative to objects, structures, monuments, natural terrain, etc., located one or more kilometers away from the vehicle 102, and such localization may be performed using any standard localization technique known in the art. The localization module 208 may output a localization signal 260 to the main system controller 2.

According to some embodiments of the present technology, the semantic segmentation module 210 may be configured to label or categorize each 3D point (i.e., each pixel of the left and right rectified images 254 and/or each pixel of the disparity map 256) as road, sky, building, sidewalk, car, human, etc. By assigning meaning to each pixel, the vehicle 102 may predict future tracks of objects and may plan a detour driving path around objects that are obstacles in a current driving path. In some embodiments, the semantic segmentation module 210 may feed the other modules of the computer processor 10, such as the lane detection module 212. Any known technique for performing semantic segmentation may be used, such as those described in "Deep Multi-Modal Object Detection and Semantic Segmentation for Autonomous Driving: Datasets, Methods, and Challenges" (D. Feng et al., IEEE Transactions on Intelligent Transportation Systems, 2021). A beneficial aspect of the cameras 100 being part of the long-forward-range and long-lateral-range stereo vision system of the perception system 1 is that images may be captured of scenes that are farther away than distances typically detectable via lidar, thus enabling objects in the scenes to be detected earlier and thus providing additional time to segment points or pixels of the images with higher accuracy and lower false or erroneous categorizations. The semantic segmentation module 210 may output a segmentation signal 262 to the main system controller 2.

According to some embodiments of the present technology, the lane detection module 212 may be configured to detect demarcated driving lanes. Conventional vision systems may use a monocular camera to discern the lane markings; however, the results are two-dimensional in the camera's plane, and typically there is a large uncertainty in each lane marking's depth or 3D position. Moreover, with lidar systems, the reliability of depth determinations typically is limited to within about 50 meters because laser light used by lidar systems tends to bounce off road surfaces in a forward direction when the laser light is incident at low or glancing angles relative to the road surfaces, and therefore the amount of returned laser light may not be sufficient to provide reliable depth information. In contrast, such a limitation may be avoided with the long-forward-range and long-lateral-range stereo vision system of the perception system 1. A beneficial aspect of the perception system 1, according to various embodiments of the present technology, is that a road or ground surface can be detected with reliable depth measurements greater than 100 meters and, in some embodiments, greater than several hundreds of meters. This may enable the use of standard lane detection algorithms to detect lane demarcations at greater distances, far ahead of the vehicle 102, thus enabling an earlier determination of potential detour paths to avoid obstacles in a current path of the vehicle 102. Any known lane detection algorithm may be used, such as those described in "Real-Time Stereo Vision-Based Lane Detection System" (R. Fan et al., Measurement Science and Technology, 2018). The lane detection module 212 may output a lane signal 264 to the main system controller 2.

According to some embodiments of the present technology, the object detection module 214 may be configured to detect objects that are above ground (e.g., on top of a road surface). In some embodiments, the object detection module 214 also may be configured to classify objects that are above ground. For example, detected objects may be classified by type (e.g., pedestrian, passenger car, tractor trailer, bicycle, street sign, traffic light, sidewalk curb, etc.). In some embodiments, the object detection module 214 may classify a detected object by utilizing any one or any combination of: a pixel mask corresponding to the detected object, a 2D bounding box that surrounds the detected object, and a 3D bounding box that surrounds the detected object. A beneficial aspect of the object detection module 214 when used in conjunction with the long-forward-range and long-lateral-range stereo vision system of the perception system 1 is that objects may be detected at a farther distance away from the vehicle 102 than with conventional vision systems and/or conventional depth-detection technologies, thus enabling additional time for the detected objects to be processed and safe driving decisions to be made (e.g., to decide a safest detour path among multiple options and to appropriate action to change the current path to the safest detour path). Any known object-detection algorithm and/or object-type-classification algorithm may be used. For example, the 3D detection method described in "Review of 3D Object Detection for Autonomous Driving of Electric Vehicles" (D. Dai et al., World Electric Vehicle Journal, 2021) may be used. The object detection module 214 may output an object signal 266 to the main system controller 2.

According to some embodiments of the present technology, the main system controller 2 may be comprised of a planning module 216 and a control module 218. The planning module 216 may be configured to receive the signals 260, 262, 264, and 266 to determine an optimal trajectory of the vehicle 102 that avoids all obstacles, that stays on a drivable road surface, and that gets the vehicle 102 closer to a desired destination in a least amount of time. The optimal trajectory may be, e.g., a safest path among multiple path options for the vehicle 102. The planning module 216 may output a path signal 268 comprised of the optimal trajectory to the control module 218. The path signal 268 may include a no-change signal indicating that the optimal trajectory is unchanged from a previous optimal trajectory for the vehicle 102 or may include a change signal indicating that the optimal trajectory is different from the previous optimal trajectory for the vehicle 102. The control module 218 may be configured to use the path signal 268 to control ECUs of the vehicle 102 so that that the optimal trajectory is followed. For example, the control module 218 may be configured to translate the path signal 268 to determine acceleration and steering parameters and to provide control signals to an acceleration ECU and a steering ECU to move the vehicle 102 from a previous optimal trajectory previously provided by the planning module 216 to a most recent optimal trajectory provided by the planning module 216.

Figure 3A:
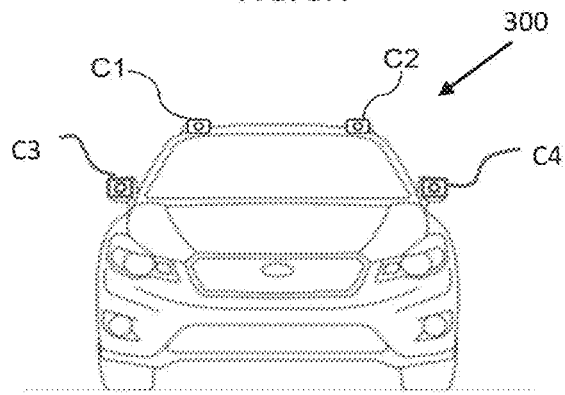
FIGS. 3A through 3E show examples of implementations of long-baseline camera pairs, according to some embodiments of the present technology.
Figure 3B:
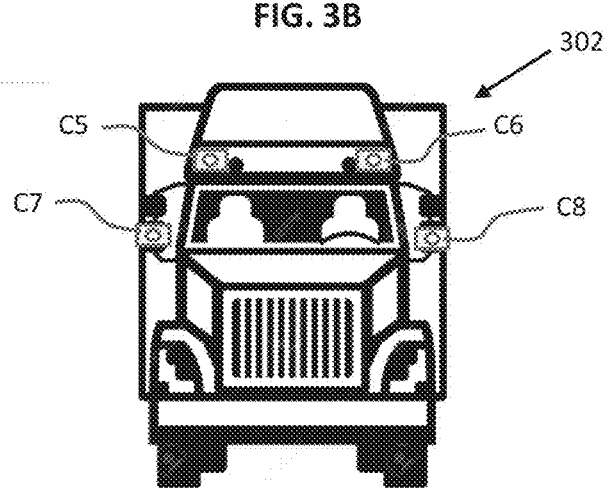
Figure 3C:
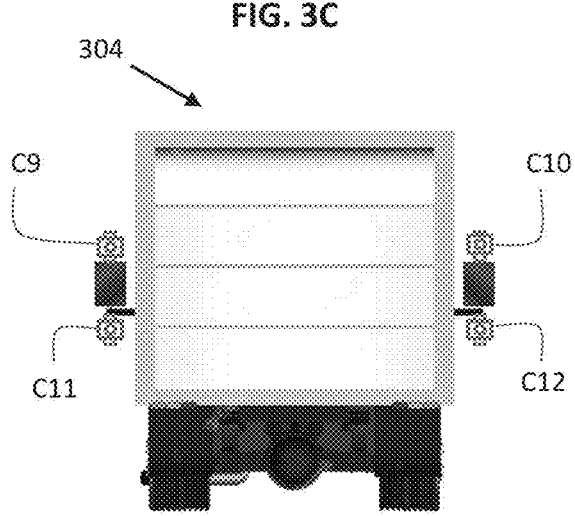
Figure 3D:
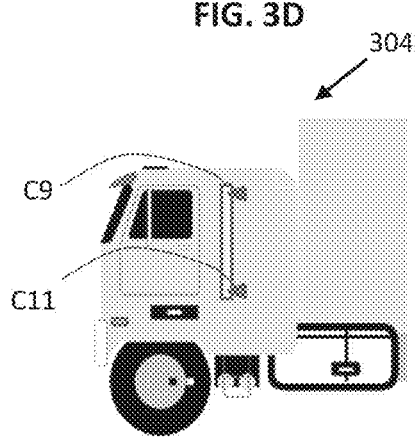

As discussed above, a long baseline for the stereo cameras 100 enables the perception system 1 to have a detection range well beyond the detection range of short-baseline camera pairs of conventional stereo vision systems. FIGS. 3A through 3E illustrate examples of implementations of long-baseline camera pairs, according to some embodiments of the present technology. In FIG. 3A, a first pair of camera sensors C1, C2 are mounted at different locations of a passenger vehicle 300 (e.g., a sedan, an SUV, etc.), and a second pair of camera sensors C3, C4 are mounted at different locations of the passenger vehicle 300. The first pair of camera sensors C1, C2 in FIG. 3A may be forward-facing to capture stereo images of a scene in front of the passenger vehicle 300 and may be separated by a distance that provides a long baseline (e.g., at least 1.2 meters). Similarly, the second pair of camera sensors C3, C4 in FIG. 3A may be rearward-facing to capture stereo images of a scene behind the passenger vehicle 300 and may be separated by a distance that provides a long baseline. For example, the first pair of camera sensors C1, C2 may be mounted on opposite sides of a roof of the passenger vehicle 300, and the second pair of camera sensors C3, C4 may be mounted on respective structures supporting right and left sideview mirrors of the passenger vehicle 300. FIG. 3B is analogous to FIG. 3A but for a truck 302 (e.g., a box truck, a tractor trailer, etc. In FIG. 3B, a first pair of forward-facing camera sensors C5, C6 may be located on a roof of a cab of the truck 302 and may be separated by a distance that provides a long baseline (e.g., a separation of at least 2.4 meters). In FIG. 3B, a second pair of rearward-facing camera sensors C7, C8 may be located on structures supporting left and right sideview mirrors of the truck 302 and may be separated by a distance that provides a long baseline (e.g., a separation of at least 3 meters). FIG. 3C shows a plurality of camera sensors C9, C10, C11, C12 mounted on structures supporting sideview mirror structure of a truck 304. For example, any two of the camera sensors C9, C10, C11, C12 may be forward facing and the remaining two of the camera sensors C9, C10, C11, C12 may be rearward facing. FIG. 3D shows an example in which the camera sensors C9, C11 are rearward facing and supported by the structure supporting the left sideview mirrors, not shown in FIG. 3D are the camera sensors C10, C12, which are frontward facing and supported by the structure supporting the right sideview mirrors.

Figure 3E:
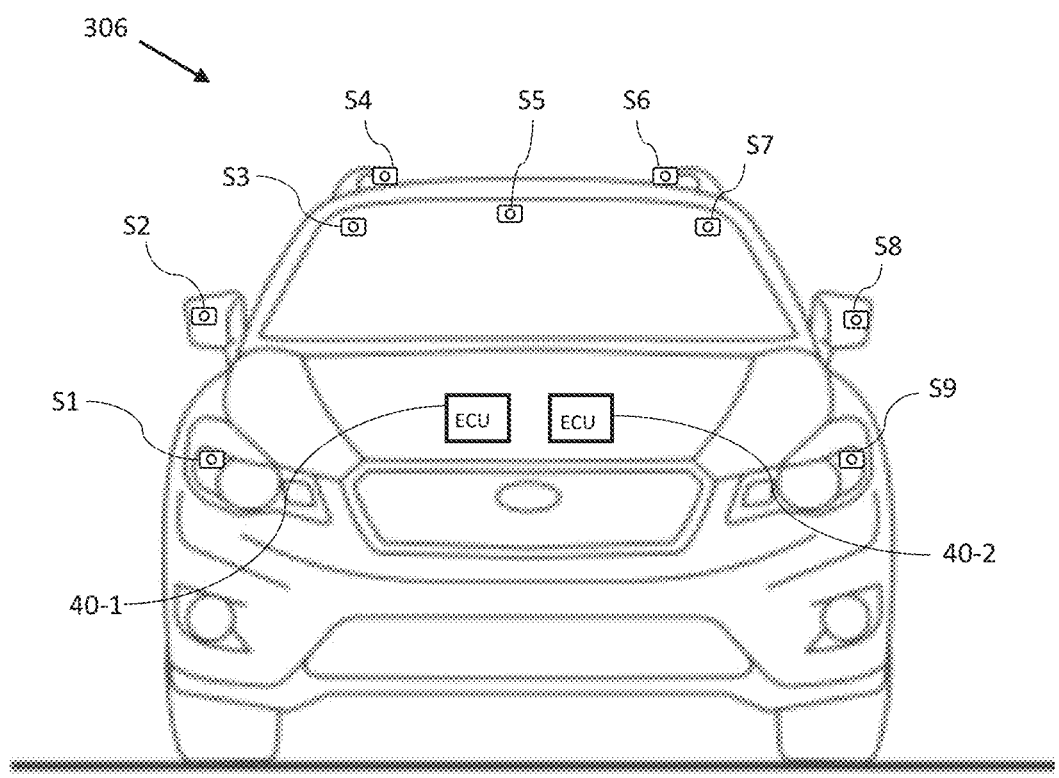

According to some embodiments of the present technology, camera sensors S1, S2, S3, S4, S5, S6, S7, S8, S9 may be located at a plurality of different locations on a vehicle 306, as schematically depicted in FIG. 3E. For example, some of the sensors S1, S2, . . . S9 may be located internal to a cabin of the vehicle 306 and therefore may be protected from pollution, rain, and debris typical of an outdoor environment. In some embodiments, some of the sensors S1, S2, . . . S9 may be located external to the cabin of the vehicle 306 and therefore may enable a baseline to be greater than a width of the cabin. In some embodiments, the sensors S1, S2, . . . S9 may be coupled wirelessly or by wires to one or more ECUs 40-1, 40-2 configured to receive data from the sensors S1, S2, . . . S9 and/or to supply power to the sensors S1, S2, . . . S9. In some embodiments, the sensors S1, S2, . . . S9 may be coupled indirectly to the ECUs 40-1, 40-2 via one or more other electronic components.

Figure 4:
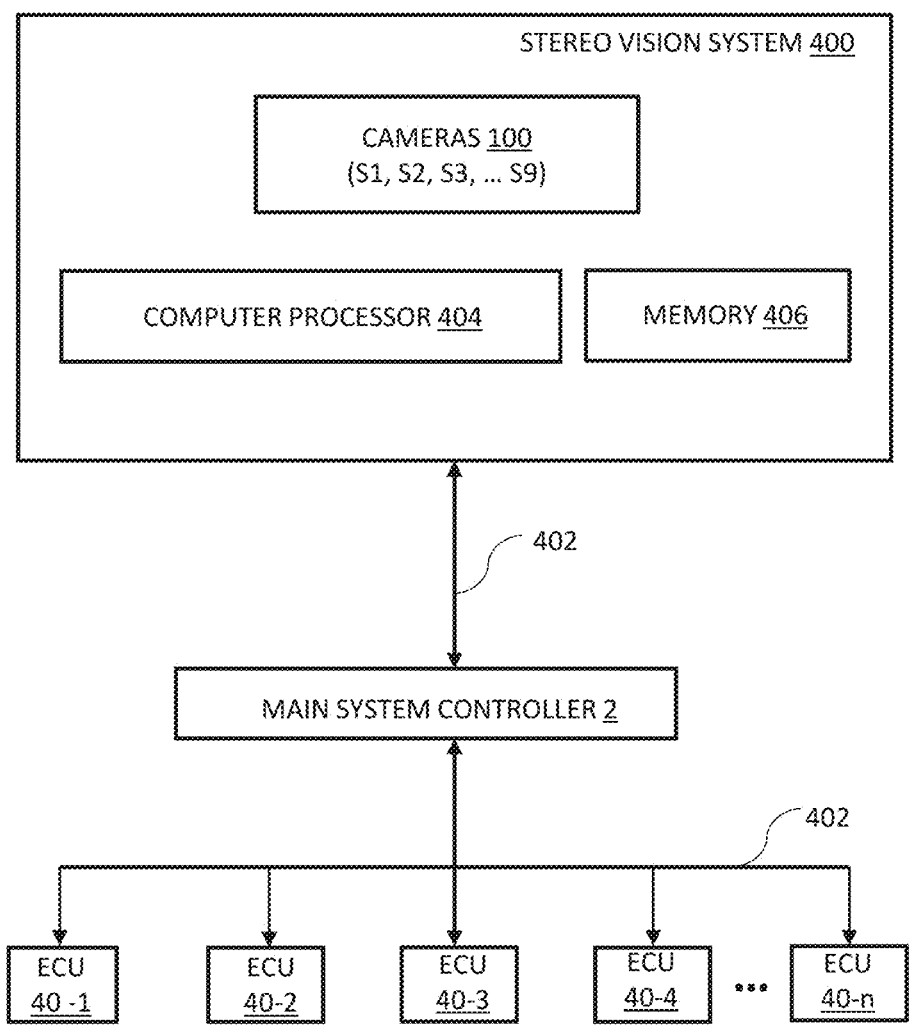
FIG. 4 shows a block diagram of a stereo vision system coupled to main system controller of a vehicle, according to some embodiments of the present technology.

According to some embodiments of the present technology, the camera sensors S1, S2, S3, S4, S5, S6, S7, S8, S9 may comprise part of the cameras 100 of the perception system 1. In some embodiments, the cameras 100 comprised of the camera sensors S1, S2, S3, S4, S5, S6, S7, S8, S9 may be part of a stereo vision system 400, as schematically depicted in FIG. 4. In some embodiments, the stereo vision system 400 may be part of the perception system 1.

In some embodiments of the present technology, the stereo vision system 400 may be coupled to the main system controller 2 of the vehicle, as schematically shown in FIG. 4. As noted above, the main system controller 2 may be the vehicle's control system, which may be configured to control all automated aspects of vehicle operation. In some embodiments, the stereo vision system 400 may be configured to be commanded by the main system controller 200 and may communicate signals to and from the main system controller 2 via a command and control line 402. As will be appreciated, the command and control line 402 may be a wired communication mechanism (e.g., a data bus, a communication line) or may be a wireless communication mechanism using communication techniques known in the art. In some embodiments, the main system controller 2 may be comprised of one or more computer processors configured to orchestrate high-level functions (e.g., automatic emergency braking, route selection, etc.) and to communicate with various sub-systems via the ECUs 40-1, 40-2 as well as other ECUs 40-3, 40-3, 40-4, . . . , 40-n to carry out the high-level functions. In some embodiments, common communication protocols may be used for communication via the command and control line 402 (e.g., Ethernet, CAN (Controller Area Network), I2C (Inter-Integrated Circuit), LIN (Local Interconnect Network), etc.). Although the stereo vision system 400 is shown in FIG. 4 to be separate from the main system controller 2, some of the stereo vision system 400 may, in some embodiments, be part of the main system controller 2 and may, in some embodiments, be physically located in a housing of the main system controller 2. For example, the camera sensors S1, S2, S3, S4, S5, S6, S7, S8, S9 of the stereo vision system 400 may be controlled by a computer processor 404, which may be physically located outside of the main system controller 2 or may physically part of the main system controller 2. A memory device 406 may be coupled to the computer processor 404 and may be configured to store code for implementing various functions of the stereo vision system 400 and/or for storing data obtained from the camera sensors S1, S2, S3, S4, S5, S6, S7, S8, S9.

According to some embodiments of the present technology, the computer processor 404 may control operation of the camera sensors S1, S2, S3, S4, S5, S6, S7, S8, S9 so that any two may be paired together to capture stereo images. For example, a pair of cameras in the headlights, S1, S9, may be controlled to operate together to capture stereo images to be used by the perception system 1 and/or a pair of cameras in the side view mirrors, S2, S8, may be controlled to operate together to capture stereo images, and/or a pair of cameras on the roof, S4, S6, may be controlled to operate together to capture stereo images and/or a pair of cameras that are not symmetrically arranged, S3, S9, may be controlled to operate together to capture stereo images.

As noted above, the stereo matching module 206 may be configured to compute a disparity between each matching pixel pair in the left and right rectified images 254 output from the rectification module 204. In some embodiments, of the present technology, the stereo matching module 206 may output a confidence map 258 and disparity data 256, which may be comprised of a 2D disparity map and/or a 2D depth map and/or a 3D point cloud, which may be considered to be equivalent products as the depth map and the point cloud can be directly derived from the disparity map.

FIG. 5A shows a block diagram of the stereo matching module 206, according to some embodiments of the present technology. In some embodiments, the stereo matching module 206 may be comprised of a stereo-matcher processing submodule 502, a disparity-combinator processing submodule 503, a disparity-refiner processing submodule 504, and a small-object disparity-refiner processing submodule 505.

Figure 6:
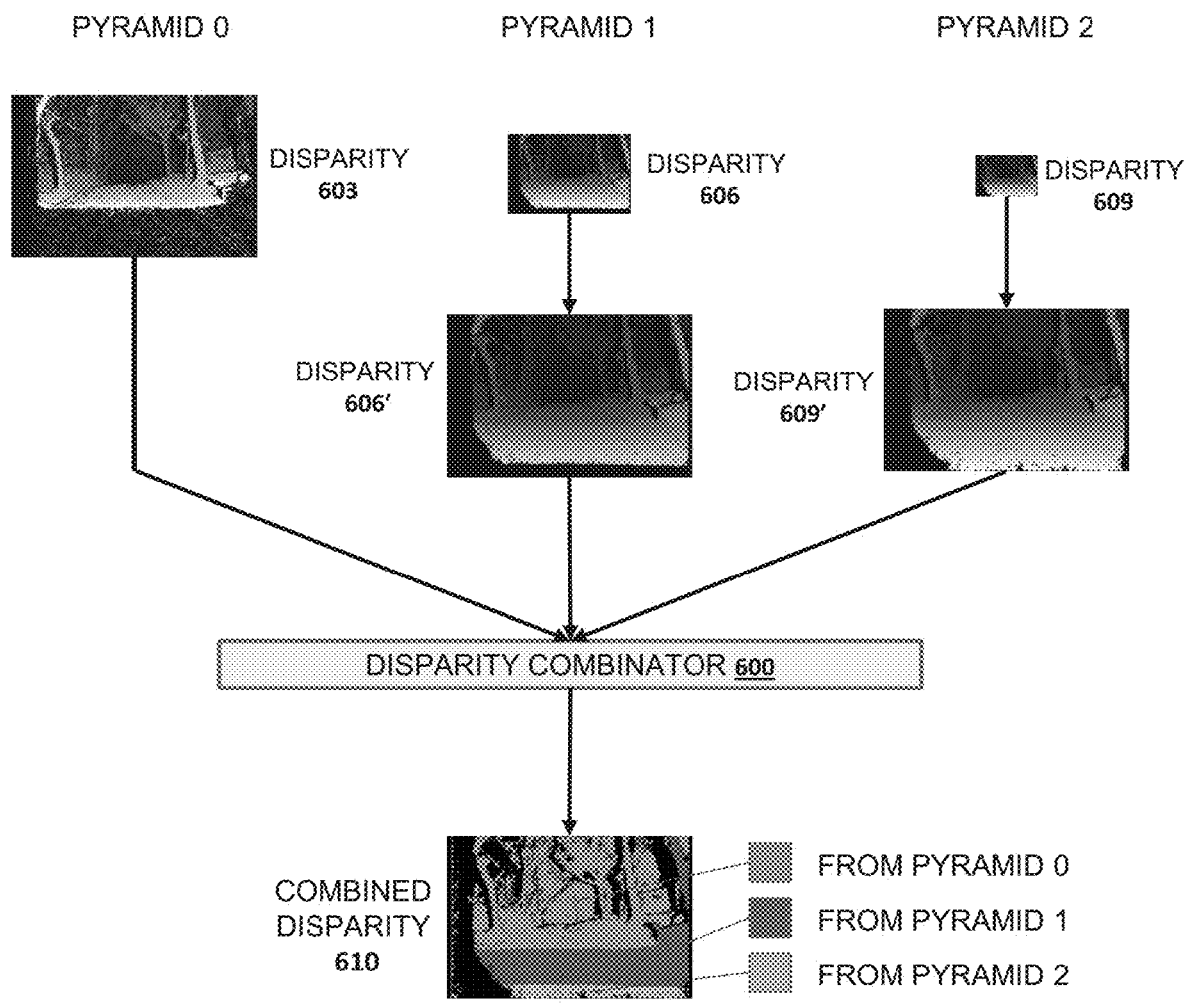
FIG. 6 illustrates a pyramiding process that may be performed by a stereo matcher module to generate preliminary disparity maps, according to some embodiments of the present technology. Portions of FIG. 6 are in color.

In some embodiments, image pairs of left and right rectified images 254 may be provided as inputs to the stereo-matcher processing submodule 502, which may perform a pyramidal process on each image pair 254 to generate disparity maps at different pyramid levels. A pyramidal process may be understood to be a process to achieve a multi-scale signal representation by subjecting an image to repeated smoothing and subsampling. A modified image at each pyramidal level k may be a result of down-sampling an image of a previous pyramid level k−1 by a factor of two, with an initial or un-down-sampled disparity map corresponding to pyramid level 0. In some embodiments, the stereo-matcher processing submodule 502 may perform the pyramidal process on an initial disparity map 603 twice, to obtain a level-1 disparity map 606 for pyramid level 1 and a level-2 disparity map 609 for pyramid level 2, as shown in FIG. 6. As represented by their sizes in FIG. 6, the amount of data of the initial disparity map 603 is greater than the amount of data of the level-1 disparity map 606, which in turn is greater than the amount of data in the level-2 disparity map 609.

FIG. 5B shows a procedure of the stereo-matcher processing submodule 502, according to some embodiments of the present technology. The left and right rectified images 254 may be comprised of a left image 254-LEFT and a right image 254-RIGHT, which may be processed by the stereo-matcher processing submodule 502 to generate the initial (level-0) disparity map 603. The left image 254-LEFT and the right image 254-RIGHT may be down-sampled (e.g., by a factor of two) to produce a left image 254'-LEFT and a right image 254'-RIGHT, which may be processed by the stereo-matcher processing submodule 502 to generate the level-1 disparity map 606. The left image 254'-LEFT and the right image 254-RIGHT' may be down-sampled (e.g., by a factor of two) to produce a left image 254''-LEFT and a right image 254''-RIGHT, which may be processed by the stereo-matcher processing submodule 502 to generate the level-2 disparity map 609. In some embodiments, the disparity maps 603, 606, 609 of the different pyramid levels may be provided to the disparity-combinator processing submodule 503, where the disparity maps 603, 606, 609 are combined.

FIG. 6 illustrates a combining procedure of the disparity-combinator processing submodule 503, according to some embodiments of the present technology. The combining procedure combines disparity maps of different pyramid levels to produce a combined disparity map 610. In the combining procedure, the initial disparity map 603 remains at its initial resolution, the level-1 disparity map 606 is converted to the resolution of the initial disparity map 603, and the level-2 disparity map 609 also is converted to the resolution of the initial disparity map 603. In some embodiments, the conversion to the resolution of the initial disparity map 603 may be done by up-sampling the disparity maps 606, 609 to the original image size, i.e., the size of initial disparity map 603, and scaling disparity values by $2^i$ to account for resolution differences, where i is the pyramid level. Without wishing to be bound by theory, a reason for scaling is that a disparity of two (2) pixels in a pyramid image of level k is equivalent to a one-pixel disparity in a pyramid image of one level higher, i.e., level k+1. In FIG. 6, the level-1 disparity map 606 is shown to be converted (up-sampled) to a modified level-1 disparity map 606', and the level-2 disparity map 609 is shown to be converted (up-sampled) to a modified level-2 disparity map 609'.

In some embodiments, a disparity combinator routine 600 of the disparity-combinator processing submodule 503 may combine the disparity maps 603, 606', 609' to produce a single disparity map: the combined disparity map 610. In FIG. 6, the combined disparity map 610 is shown with different colors and/or different intensities to show contributions from different pyramid levels, i.e., level 0, level 1, and level 2. In some embodiments, a beneficial aspect of performing the pyramidal process on an image is that the pyramidal process may effectively increase a disparity search range by a factor of two, and thus may significantly extend the effective depth range by decreasing the minimum depth that may be searched. Stated differently, the pyramidal process may enable a reduction in the number of computations to be performed, without a significant loss of meaningful information, and therefore may permit an increase in the search range or depth range of the perception system 1. The pyramidal process effectively frees up computational resources for searching at depths closer to the vehicle, which may be depths typically not searched due to computational limitations. In some embodiments, operations performed by in the disparity-combinator processing submodule 503 may involve only simple matrix arithmetic and therefore may be executed quickly (e.g., in real time) without imposing a significant burden on available computational resources.

According to some embodiments of the present technology, a disparity search range may be divided into a plurality of sub-ranges corresponding to the plurality of pyramid levels. For example, for the three pyramid levels in the example shown in FIG. 6, there may be three disparity search sub-ranges. In some embodiments, disparities corresponding to higher-resolution (lower pyramid level) pixels may take precedence and be selected for inclusion in the combined disparity map 610 over disparities corresponding to lower-resolution (higher pyramid level) pixels, where disparity search ranges overlap. In this manner, disparities from non-overlapping search ranges may be combined according to expression (2):

$$D^c_{range\_i} = D^i_{range\_i} \text{ for } i=0, \ldots, \max_i \quad (2),$$

where i is the pyramid level; $D^c$ is the combined disparity map value; $D^i$ is the disparity map from pyramid level i; range_i is the disparity search range at pyramid i, excluding any ranges of lower pyramid levels; and max_i is the maximum pyramid level. TABLE 1 shows non-overlapping disparity search ranges for three pyramid levels, according to some embodiments of the present technology:

TABLE 1

| Pyramid level: i | Non-overlapping search range: range_i |
| --- | --- |
| 0 | [0, 255] |
| 1 | [256, 511] |
| 2 | [512, 1023] |

In some embodiments, the same initial disparity search range of [0, 255] may be used for all three pyramid levels 0, 1, and 2. Pyramid level 1 may have a non-overlapping disparity search range of [256, 511], corresponding to a medium-resolution search, and pyramid level 2 may have a non-overlapping disparity search range of [512, 1023], corresponding to a low-resolution search. It should be understood that the initial disparity search range need not be identical for all the different pyramid levels. In some embodiments, the initial disparity search range may be different from pyramid level to pyramid level, and may be adjusted based on computing cost and a depth range of interest in an actual scene captured by the stereo vision system.

Manipulation of the initial disparity map using the pyramidal process discussed above may permit perception and navigation based on a modified disparity map (e.g., the combined disparity map 610) that has less detail than the initial disparity map. Such manipulation may not significantly impact detection of far-away objects but, advantageously, may enable detection of nearby objects that are closer than what is detectable using conventional stereo vision schemes. Thus, in some embodiments of the present technology, the perception system 1 may enable detection of objects over a wider range of depths or distances than what is possible with conventional techniques. For example, assuming an initial disparity map is obtained by a stereo vision system in which a pair of camera sensors are positioned with a baseline of 1 meter and with a focal length corresponding to 4,000 pixels, a combined disparity map produced from the initial disparity may can provide depth detection for objects as close as approximately 3 meters (e.g., 3.9 meters) from the vehicle on which the stereo vision system is mounted. The ability to detect nearby objects at such a close distance in addition to detecting objects at faraway distances is highly advantageous for autonomous vehicles and for driver-assistance systems, as discussed above. A relatively higher-level pyramid may have a lower resolution than that of a lower-level pyramid, and therefore the disparity map for the higher-level pyramid may have less detail than the disparity map for the lower-level pyramid, but such a reduction in the amount of detail may be acceptable for autonomous-vehicle applications because lower angular sampling may be acceptable for closer objects that occupy a large part of the stereo images from which the disparity map is derived. That is, objects in nearby regions that are close to the vehicle may appear large and may be detectable even at the lower resolutions of pyramid levels 1 and 2, and therefore the reduction in detail by the pyramid process discussed above does not significantly affect their ability to be detected. One the other hand, objects in distant regions that are far away from the vehicle objects may appear small or may even not be discerning from imaging noise at pyramid levels 1 and 2, and therefore high-resolution disparity results are retained for distant objects.

Turning back to FIG. 5A, the combined disparity map 610 may be provided to the disparity-refiner processing submodule 504 for noise reduction and other refinements. In some embodiments, the disparity-refiner processing submodule 504 may reduce the number of invalid regions as well as reduce noise in the combined disparity map 610.

Figure 7A:
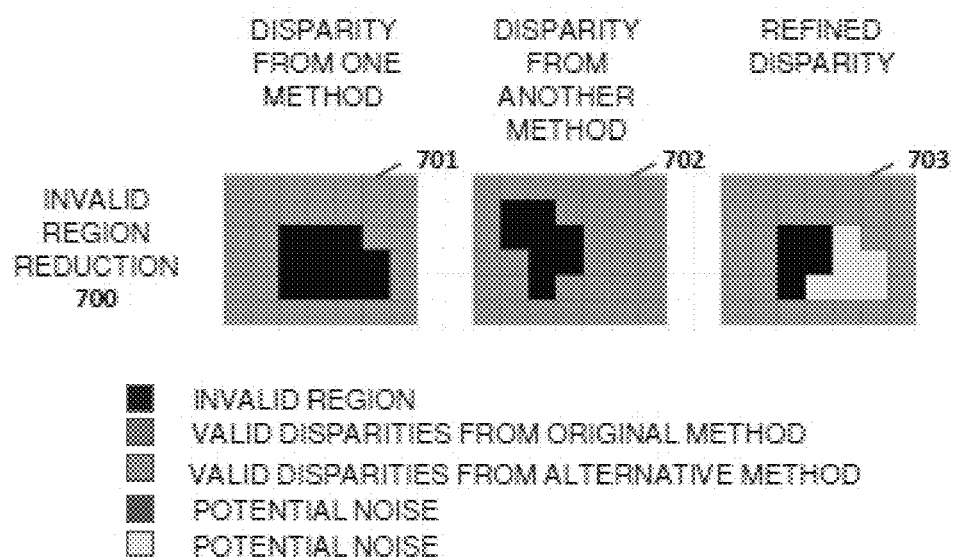
FIG. 7A shows a diagram illustrating reduction of invalid regions in a disparity map, according to some embodiments of the present technology. Portions of FIG. 7A are in color.
Figure 7B:
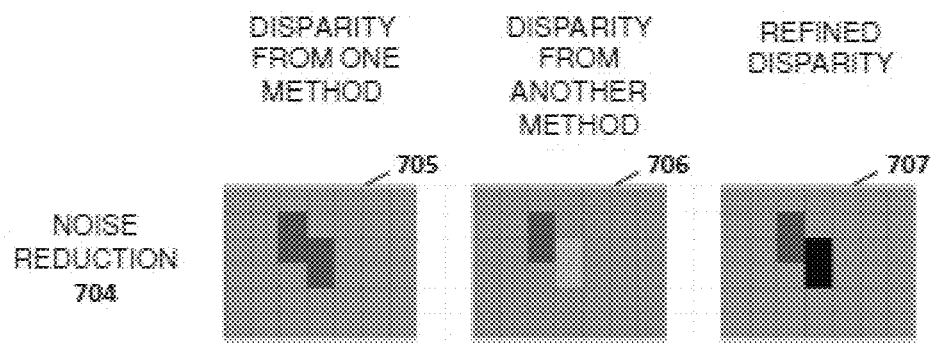
FIG. 7B shows a diagram illustrating reduction of noise in a disparity map, according to some embodiments of the present technology. Portions of FIG. 7B are in color.

FIG. 7A shows a diagram illustrating reduction of invalid regions by the disparity-refiner processing submodule 504, according to some embodiments of the present technology. FIG. 7B shows a diagram illustrating noise reduction by the disparity-refiner processing submodule 504, according to some embodiments of the present technology. A pixel key shown at the bottom of FIG. 7A may also be used for FIG. 7B According to some embodiments of the present technology, in a procedure 700 for reducing invalid regions by reducing their sizes, the disparity-refiner processing submodule 504 may process a first disparity map 701 obtained using a first stereo-matching procedure, in which the disparity map may include one or more invalid regions. In some embodiments, the first disparity map 701 may result from stereo-matching images used in producing disparity data for pyramid level 0. A second disparity map 702 obtained using a different stereo-matching procedure may have valid pixels (i.e., pixels with valid disparity data) at the same locations as pixels of the invalid regions of the first disparity map 701. In some embodiments, the second disparity map 702 may result from stereo-matching images used in producing disparity data for pyramid level 1 and/or pyramid level 2. In some embodiments, for the invalid regions of the first disparity map 701, invalid pixels of the first disparity map 701 may be valid pixels of the second disparity map 702 at the same locations as the invalid pixels. Although the different stereo-matching procedure in the discussion above is stereo matching using lower-resolution pyramid images, other different stereo-matching procedures may be used. For example, a stereo-matching procedure using one or more different parameters, such as scan window size (discussed below) may be used to produce the second disparity map 702. A refined disparity map 703 may result from the replacement of invalid pixels with valid pixels, with the refined disparity map 703 having fewer pixels with invalid disparity values compared to the first disparity map 701.

According to some embodiments of the present technology, in a procedure 704 for reducing noise, the disparity-refiner processing submodule 504 may compare a disparity map 705 obtained using a first stereo-matching procedure with another disparity map 706 obtained using a different stereo-matching procedure to determine consistency amongst the corresponding pixels of the two disparity maps 705, 706. Pixels in the disparity map 705 that have disparity values consistent with their corresponding pixels at the same location in the other disparity map 706 may be deemed valid. In some embodiments, consistency is determined based on a difference in the disparity values of a pixel in the disparity map 705 and its corresponding pixel in the other disparity map 706. For each pixel of the disparity map 705, if the difference is above a predetermined threshold, the pixel may be regarded being of low confidence and marked as invalid. On the other hand, if the difference is at or below the predetermined threshold then the pixel may be regarded being of acceptable confidence and marked as valid.

For example, in FIG. 7B, the two left-most (dark-blue shaded) pixels of the disparity maps 705, 706 may have sufficiently similar disparity values (e.g., differences at or below the predetermined threshold), resulting in a refined disparity map 707 in which the two pixels at the same locations as those two left-most (dark-blue shaded) pixels each have a disparity value that is an average of the disparity values of the corresponding pixel of the disparity maps 705, 706. On the other hand, the two right-most (dark-blue shaded) pixels of the disparity map 705 may have insufficiently similar disparity values compared to the corresponding two right-most (yellow shaded) pixels of the other disparity map 706 (e.g., differences above the predetermined threshold), resulting in the refined disparity map 707 in which the two pixels at the same locations as the two right-most pixels each being marked as invalid. Thus, the refined disparity map 707 may have less noise compared to the disparity map 705. In some embodiments, operations performed by the disparity-refiner processing submodule 504 may involve only simple matrix arithmetic and therefore may be executed quickly (real time) without imposing a significant burden on available computational resources.

In some embodiments of the present technology, a refinement procedure performed by the disparity-refiner processing submodule 504 may perform stereo matching using different scan-window sizes. A scan window typically is used when matching a pixel and its neighbors from one image with another pixel and its neighbors from another image. A scan window may be usually characterized as a rectangular block of size n×m, with n pixels along one side of the rectangle and m pixels along another, adjacent side of the rectangle. In some embodiments, invalid disparities from one scan window size may be replaced by valid disparities from a different scan window size at the same pixel locations. In some embodiments, known block matching algorithms may use a rectangular window to compute a cost, such as a "sum of absolute differences" cost (see Hirschmuller et al., IEEE Conference on Computer Vision and Pattern Recognition, 2007). In some embodiments, known stereo-matching algorithms may use a census transform window to extract information around a pixel for comparison (see Zabih et al., ECCV, 1994). As will be appreciated, different scan-window sizes may be suitably adapted for different objects at different ranges and with different textures. Objects with larger scale texture variations in an image may be better processed with a larger scan-window size, whereas objects with fewer large-scale textures but a greater number of small-scale textures (e.g., road surfaces) may be better processed with a smaller scan-window size. In some embodiments, in order to reduce processing time while performing stereo matching with different scan window sizes, scan windows may be applied selectively to regions of interest and/or for pyramid images with lower resolutions.

In some embodiments of the present technology, the disparity-refiner processing submodule 504 may combine the refined disparity map 703 and the refined disparity map 707 to produce a combined refined disparity map 710 in which the invalid regions are reduced in size and in which the amount of noise is reduced.

Figure 8:
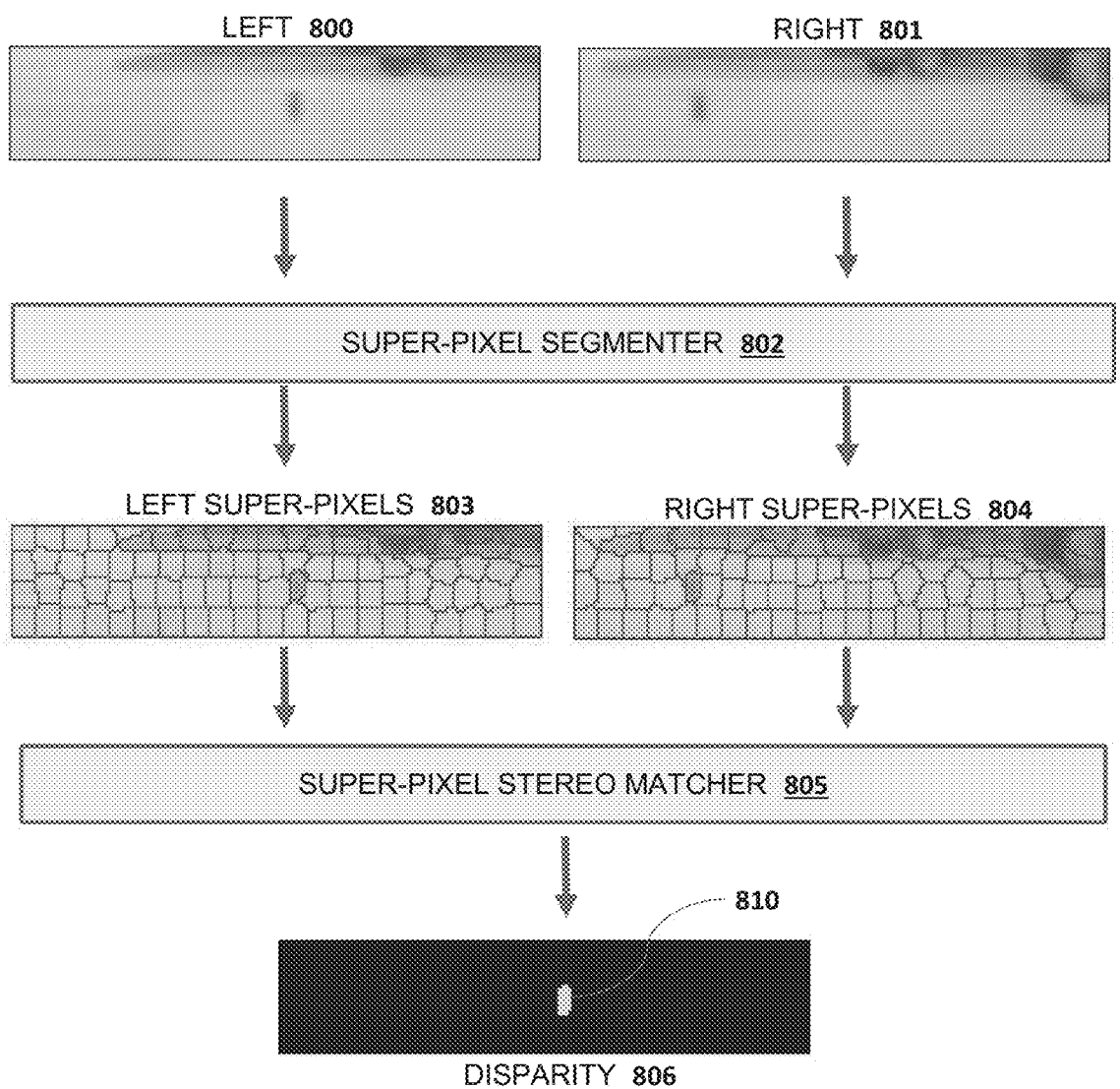
FIG. 8 shows a diagram illustrating a small-object disparity-refinement procedure, according to some embodiments of the present technology. Portions of FIG. 8 are in color.

Turning back to FIG. 5A, the refined disparity map 703 and/or the refined disparity map 707 and/or the combined refined disparity map 710 may be provided to the small-object disparity-refiner processing submodule 505 to detect small objects. As discussed above, the perception system 1 may use high-resolution images captured by a pair of cameras separated by a long baseline to detect small objects near the vehicle or far from the vehicle. FIG. 8 illustrates a small-object disparity-refinement procedure performed by the small-object disparity-refiner processing submodule 505 to refine estimates of disparity for small objects at long distances from the vehicle, according to some embodiments of the present technology. In some embodiments, for far-away objects that are small in size, depth variation within each object itself may be ignored. Instead, each object may be regarded as having a single distance to the vehicle (or to the stereo cameras on the vehicle). On the other hand, each object's 2D shape, orientation, size, and color may be similar from the perspective of each of the stereo cameras. With these considerations, for each of the left and right images, image regions around small objects may be segmented using known super-pixel techniques (e.g., see Achanta et al., IEEE Trans. Pattern Anal. Mach. Intell., 2012) and then stereo matching may be performed based on super-pixels instead of on conventional pixels. In some embodiments, instead of segmenting the left and right images in their entireties, portions of these images may be segmented into super-pixels in a region of interest.

In the procedure illustrated in FIG. 8, a left image 800 and a right image 801, which may be derived from the left and right rectified images 254, are provided to a super-pixel segmenter 802. Each of the images 800, 801 undergoes segmenting into super-pixels using a known super-pixel technique, to obtain left and right segmented images 803, 804 comprised of super-pixels. During segmenting, each object in the images 800, 801 having a sufficient color contrast relative to a background color (i.e., sufficient to be able to be discernable from the background color) may be segmented or delineated according to its edge interfaces or boundaries with the background color. In some instances, each object may belong to a single super-pixel. The left and right segmented images 803, 804 then undergo stereo-matching by a super-pixel-based stereo matcher 805, which outputs a super-pixel disparity map 806. In some embodiments, stereo matching may be done based on features extracted from each super-pixel, including features relating to each super-pixel's color, shape, size and orientation. An advantage of taking these features into consideration is that the stereo-matching technique performed by the super-pixelbased stereo matcher 805 may, e.g., combine RGB color information across multiple super-pixels at the original resolution. This may enable super-pixel-based stereo matching to have a higher sensitivity than stereo matching performed pixel by pixel for ordinary pixels. In some embodiments, an object 810 may be identified from the super-pixel disparity map 806 based on any one or any combination of: a disparity of a super-pixel corresponding to the object 810, a color contrast of the super-pixel corresponding to the object 810 relative to a background color, a shape of the super-pixel corresponding to the object 810, a size of the super-pixel corresponding to the object 810, and an orientation of the super-pixel corresponding to the object 810. In some embodiments, the object 810 may have a dimension of about 100 cm or about 80 cm or about 60 cm or about 40 cm or about 20 cm. In some embodiments, in order to improve speed, super-pixel-based stereo matching may be applied to a small region of interest in the left and right images 800, 801 images. For example, a rectangular window covering a far-away section of the road may undergo super-pixel-based stereo matching. In some embodiments, the super-pixel disparity map 806 may provide a disparity value for each super-pixel.

In some embodiments, the disparity map 256 output by the stereo matching module 206 may be a final disparity map comprised of the combined refined disparity map 710 that has undergone the small-object disparity-refinement procedure discussed above. In some embodiments, that and a confidence map 258. In some embodiments, because the final disparity map 256 may be comprised of enhanced or refined disparity values for small objects that are far away from the vehicle, the perception system 1 may use information from the final disparity map 256 to detect distant, small objects and, if a detected object is determined to be an obstacle in the vehicle's path of movement, may provide signals to the main system controller 2 so that the vehicle may be controlled to avoid the obstacle. In some embodiments, the stereo matching module 206 may output the final disparity map 256 together with the confidence map 258, as discussed above. In some embodiments, the final disparity map 256 may be comprised of a depth map and a 3D point cloud. For example, the depth map may be computed from the disparity map 603 and expression (1), discussed above, and the 3D point cloud may be produced from segmentation data for small objects identified from the stereo matching of the left and right segmented images 803, 804 by the super-pixel-based stereo matcher 805, discussed above.

A perception system according to the technology described herein may be embodied in different configurations. Example configurations include combinations of configurations (1) through (11), as follows:

(1) A small-object perception system for use in a vehicle, the system comprising: a stereo vision system configured to capture stereo images and to output information identifying an object having a dimension in a range of about 100 cm to about 20 cm in a perception range of approximately 3 meters to at least approximately 150 meters from the vehicle; and a system controller configured to receive output signals from the stereo vision system and to provide control signals to control a path of movement of the vehicle.

(2) The perception system of configuration (1), wherein the stereo vision system is comprised of at least one pair of cameras separated by a baseline in a range of about 1 meter to about 4 meters.

(3) The perception system of any one of configurations (1) and (2), wherein: the stereo vision system is comprised of a computer processing system that includes at least one computer processor and a memory operably connected to the at least one computer processor, and the computer processing system is comprised of a stereo matching module configured to perform stereo matching on a pair of stereo images comprised of left and right initial images and to output a final disparity map based on a plurality of preliminary disparity maps generated from the left and right initial images, the preliminary disparity maps having different resolutions from each other.

(4) The perception system of any one of configurations (1) through (3), wherein the preliminary disparity maps are comprised of: a level-zero disparity map having a resolution of the pair of stereo images, a level-one disparity map having a first resolution that is lower than the resolution of the pair of stereo images, and a level-two disparity map having a second resolution that is lower than the first resolution.

(5) The perception system of any one of configurations (1) through (4), wherein: the level-zero disparity map provides disparity information for at least a far-distance region of the final disparity map, the far-distance region including a distance of approximately 150 meters from the vehicle, the level-two disparity map provides disparity information for at least a near-distance region of the final disparity map, the near-distance region including a distance of approximately 3 meters from the vehicle, and the level-one disparity map provides disparity information for at least an intermediate-distance region of the final disparity map, the intermediate distance including a distance of approximately 75 meters from the vehicle.

(6) The perception system of any one of configurations (1) through (5), wherein the stereo matching module is configured to: combine the preliminary disparity maps into a combined disparity map, and refine the combined disparity map by: reducing noise in the combined disparity map to produce a first refined disparity map, or reducing a size of one or more invalid regions in the combined disparity map to produce a second refined disparity map, or reducing the noise and the size of one or more invalid regions in the combined disparity map to produce a third refined disparity map.

(7) The perception system of any one of configurations (1) through (6), wherein the stereo matching module is configured to detect a small object using left and right images used to produce any one of: the final disparity map, the first refined disparity map, the second refined disparity map, and the third refined disparity map, or used to produce any one of the preliminary disparity maps, by: segmenting each of the left and right images or a portion of each of the left and right images to produce left and right super-pixel images, performing stereo matching on the left and right super-pixel images to produce a super-pixel disparity map, and identifying the object based on at least one super-pixel of the super-pixel disparity map.

(8) The perception system of any one of configurations (1) through (7), wherein the stereo matching is performed on the left and right super-pixel images based on any one or any combination of: a color contrast of one or more super-pixels of the left and right super-pixel images, a shape of one or more super-pixels of the left and right super-pixel images, a size of one or more super-pixels of the left and right super-pixel images, and an orientation of one or more super-pixels of the left and right super-pixel images.

(9) The perception system of any one of configurations (1) through (8), wherein the object is identified based on any one or any combination of: a disparity of the at least one super-pixel of the super-pixel disparity map, a color contrast of the at least one super-pixel of the super-pixel disparity map, a shape of the at least one super-pixel of the super-pixel disparity map, a size of the at least one super-pixel of the super-pixel disparity map, and an orientation of one or more super-pixels of the super-pixel disparity map.

(10) The perception system of any one of configurations (1) through (9), wherein the stereo matching module is configured to reduce the noise in the combined disparity map by replacing an invalid disparity value of a pixel of a lower-level disparity map with a valid disparity value of a corresponding pixel of a higher-level disparity map.

(11) The perception system of any one of configurations (1) through (10), wherein the stereo matching module is configured to reduce the size of one or more invalid regions of the combined disparity map by replacing invalid disparity values of a portion of an invalid region of a lower-level disparity map with a valid disparity values of a corresponding portion of a higher-level disparity map.

A method of a perception system according to the technology described herein may be embodied in different process configurations. Example configurations include combinations of configurations (12) through (20), as follows:

(12) A method of a small-object perception system used in a vehicle, the method comprising: obtaining stereo images captured by a stereo vision system; generating, by at least one computer processor, perception information from the stereo images, the perception information including information identifying an object having a dimension in a range of about 100 cm to about 20 cm in a perception range of approximately 3 meters to at least approximately 150 meters from the vehicle; and outputting the perception information to a system controller configured to use the perception information to provide control signals to control a path of movement of the vehicle, wherein the stereo images are captured by a pair of cameras separated by a baseline in a range of about 1 meter to about 4 meters.

(13) The method of configuration (12), wherein: the stereo images are comprised of left and right initial images, and the generating of the perception information is comprised of: performing stereo matching on the left and right initial images, generating a plurality of preliminary disparity maps from the left and right initial images, the preliminary disparity maps having different resolutions from each other, and outputting a final disparity map based on the preliminary disparity maps.

(14) The method of any one of configurations (12) and (13), wherein the preliminary disparity maps are comprised of: a level-zero disparity map having a resolution of the stereo images, a level-one disparity map having a first resolution that is lower than the resolution of the stereo images, and a level-two disparity map having a second resolution that is lower than the first resolution, wherein the level-zero disparity map provides disparity information for at least a far-distance region of the final disparity map, the far-distance region including a distance of approximately 150 meters from the vehicle, wherein the level-two disparity map provides disparity information for at least a near-distance region of the final disparity map, the near-distance region including a distance of approximately 3 meters from the vehicle, and wherein the level-one disparity map provides disparity information for at least an intermediate-distance region of the final disparity map, the intermediate distance including a distance of approximately 75 meters from the vehicle.

(15) The method of any one of configurations (12) through (14), wherein the generating of the perception information is comprised of: combining the preliminary disparity maps into a combined disparity map, and refining the combined disparity map by: reducing noise in the combined disparity map to produce a first refined disparity map, or reducing a size of one or more invalid regions in the combined disparity map to produce a second refined disparity map, or reducing the noise and the size of one or more invalid regions in the combined disparity map to produce a third refined disparity map.

(16) The method of any one of configurations (12) through (15), wherein the generating of the perception information is comprised of detecting a small object using left and right images used to produce any one of: the final disparity map, the first refined disparity map, the second refined disparity map, and the third refined disparity map, or used to produce any one of the preliminary disparity maps, by: segmenting each of the left and right images or a portion of each of the left and right images to produce left and right super-pixel images, performing stereo matching on the left and right super-pixel images to produce a super-pixel disparity map, and identifying the object based on at least one super-pixel of the super-pixel disparity map.

(17) The method of any one of configurations (12) through (16), wherein the performing of the stereo matching is based on any one or any combination of: a color contrast of one or more super-pixels of the left and right super-pixel images, a shape of one or more super-pixels of the left and right super-pixel images, a size of one or more super-pixels of the left and right super-pixel images, and an orientation of one or more super-pixels of the left and right super-pixel images.

(18) The method of any one of configurations (12) through (17), wherein the identifying of the object is based on any one or any combination of: a disparity of the at least one super-pixel of the super-pixel disparity map, a color contrast of the at least one super-pixel of the super-pixel disparity map, a shape of the at least one super-pixel of the super-pixel disparity map, a size of the at least one super-pixel of the super-pixel disparity map, and an orientation of one or more super-pixels of the super-pixel disparity map.

(19) The method of any one of configurations (12) through (18), wherein the reducing of the noise in the combined disparity map is comprised of replacing an invalid disparity value of a pixel of a lower-level disparity map with a valid disparity value of a corresponding pixel of a higher-level disparity map.

(20) The method of any one of configurations (12) through (19), wherein the reducing of the size of one or more invalid regions of the combined disparity map is comprised of replacing invalid disparity values of a portion of an invalid region of a lower-level disparity map with a valid disparity values of a corresponding portion of a higher-level disparity map.

A non-transitory computer-readable storage medium storing code for a perception system according to the technology described herein may be embodied in different configurations. Example configurations include combinations of configurations (21) through (29), as follows:

(21) A non-transitory computer-readable storage medium storing code that, when executed by a computer system comprised of at least one computer processor, causes the computer system to perform a method of a small-object perception system, wherein the method is comprised of: obtaining stereo images captured by a stereo vision system; generating perception information from the stereo images, the perception information including information identifying an object having a dimension in a range of about 100 cm to about 20 cm in a perception range of approximately 3 meters to at least approximately 150 meters from the vehicle; and outputting the perception information to a system controller configured to use the perception information to provide control signals to control a path of movement of the vehicle, wherein the stereo images are captured by a pair of cameras separated by a baseline in a range of about 1 meter to about 4 meters.

(22) The computer-readable storage medium of configuration (21), wherein: the stereo images are comprised of left and right initial images, and the generating of the perception information is comprised of: performing stereo matching on the left and right initial images, generating a plurality of preliminary disparity maps from the left and right initial images, the preliminary disparity maps having different resolutions from each other, and outputting a final disparity map based on the preliminary disparity maps.

(23) The computer-readable storage medium of any one of configurations (21) and (22), wherein the preliminary disparity maps are comprised of: a level-zero disparity map having a resolution of the stereo images, a level-one disparity map having a first resolution that is lower than the resolution of the stereo images, and a level-two disparity map having a second resolution that is lower than the first resolution, wherein the level-zero disparity map provides disparity information for at least a far-distance region of the final disparity map, the far-distance region including a distance of approximately 150 meters from the vehicle, wherein the level-two disparity map provides disparity information for at least a near-distance region of the final disparity map, the near-distance region including a distance of approximately 3 meters from the vehicle, and wherein the level-one disparity map provides disparity information for at least an intermediate-distance region of the final disparity map, the intermediate distance including a distance of approximately 75 meters from the vehicle.

(24) The computer-readable storage medium of any one of configurations (21) through (23), wherein the generating of the perception information is comprised of: combining the preliminary disparity maps into a combined disparity map, and refining the combined disparity map by: reducing noise in the combined disparity map to produce a first refined disparity map, or reducing a size of one or more invalid regions in the combined disparity map to produce a second refined disparity map, or reducing the noise and the size of one or more invalid regions in the combined disparity map to produce a third refined disparity map.

(25) The computer-readable storage medium of any one of configurations (21) through (24), wherein the generating of the perception information is comprised of detecting a small object using left and right images used to produce any one of: the final disparity map, the first refined disparity map, the second refined disparity map, and the third refined disparity map, or used to produce any one of the preliminary disparity maps, by: segmenting each of the left and right images or a portion of each of the left and right images to produce left and right super-pixel images, performing stereo matching on the left and right super-pixel images to produce a super-pixel disparity map, and identifying the object based on at least one super-pixel of the super-pixel disparity map.

(26) The computer-readable storage medium of any one of configurations (21) through (25), wherein the performing of the stereo matching is based on any one or any combination of: a color contrast of one or more super-pixels of the left and right super-pixel images, a shape of one or more super-pixels of the left and right super-pixel images, a size of one or more super-pixels of the left and right super-pixel images, and an orientation of one or more super-pixels of the left and right super-pixel images.

(27) The computer-readable storage medium of any one of configurations (21) through (26), wherein the identifying of the object is based on any one or any combination of: a disparity of the at least one super-pixel of the super-pixel disparity map, a color contrast of the at least one super-pixel of the super-pixel disparity map, a shape of the at least one super-pixel of the super-pixel disparity map, a size of the at least one super-pixel of the super-pixel disparity map, and an orientation of one or more super-pixels of the super-pixel disparity map.

(28) The computer-readable storage medium of any one of configurations (21) through (27), wherein the reducing of the noise in the combined disparity map is comprised of replacing an invalid disparity value of a pixel of a lower-level disparity map with a valid disparity value of a corresponding pixel of a higher-level disparity map.

(29) The computer-readable storage medium of any one of configurations (21) through (28), wherein the reducing of the size of one or more invalid regions of the combined disparity map is comprised of replacing invalid disparity values of a portion of an invalid region of a lower-level disparity map with a valid disparity values of a corresponding portion of a higher-level disparity map.

REFERENCES

U.S. Pat. No. 8,971,634.

H. Hirschmuller and D. Scharstein, "Evaluation of Cost Functions for Stereo Matching," IEEE Conference on Computer Vision and Pattern Recognition, pp. 1-8, 2007.

S. Sarika et al., "Census Filtering Based Stereomatching Under Varying Radiometric Conditions," Procedia Computer Science, vol. 58, pp. 315-320, 2015.

R. Zabih and J. Woodfill, "Non-Parametric Local Transforms for Computing Visual Correspondence," Proceedings of the 3rd European Conference on Computer Vision (ECCV), pp. 151-158, 1994.

R. Achanta, A. Shaji, K. Smith, A. Lucchi, P. Fua, and S. Susstrunk, "SLIC Superpixels Compared to State-of-the-Art Superpixel Methods," IEEE Transactions on Pattern Analysis and Machine Intelligence, vol. 34, no. 11, pp. 2274-2282, 2012.

A. Woo, B. Fidan, W. W. Melek, "Localization for Autonomous Driving," chapter 29 in "Handbook of Position Location: Theory, Practice, and Advances," second edition, edited by S. A. Zekavat and R. M. Buehrer, IEEE, pp. 1051-1087, 2019.

D. Feng, C. Haase-Shütz, L. Rosenbaum, H. Hertlein, C. Glaser, F. Timm, W. Wiesbeck, and K. Dietmayer, "Deep Multi-Modal Object Detection and Semantic Segmentation for Autonomous Driving: Datasets, Methods, and Challenges," IEEE Transactions on Intelligent Transportation Systems, vol. 22, no. 3, pp. 1341-1360, 2021.

R. Fan and N. Dahnoun, "Real-Time Stereo Vision-Based Lane Detection System," Measurement Science and Technology, vol. 29, no. 7, 24 pages, 2018.

D. Dai, Z. Chen, and P. Bao, "A Review of 3D object Detection for Autonomous Driving of Electric Vehicles," World Electric Vehicle Journal, vol. 12, no. 139, 18 pages, 2021.

CONCLUSION

It should be understood that various alterations, modifications, and improvements may be made to the structures, configurations, and methods discussed above, and are intended to be within the spirit and scope of the invention disclosed herein. Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. A small-object perception system for use in a vehicle, the system comprising:
   a stereo vision system configured to capture stereo images and to output perception information; and
   a system controller configured to receive the perception information from the stereo vision system and to provide control signals to control a path of movement of the vehicle, based on the perception information,
   wherein the stereo vision system comprises a computer processing system that includes at least one computer processor and a memory operably connected to the at least one computer processor, the computer processing system being configured to:
      perform stereo matching on stereo images comprising left and right initial images, and
      output a final disparity map based on a plurality of preliminary disparity maps generated from the left and right initial images, the preliminary disparity maps having different resolutions from each other,
   wherein the final disparity map is generated by the computer processing system by:
      segmenting at least a subset of each of the left and right initial images to produce left and right super-pixel images,
      performing stereo matching on the left and right super-pixel images to produce a super-pixel disparity map, and
      identifying an object based on the super-pixel disparity map.

2. The perception system of claim 1, wherein the preliminary disparity maps comprise:
   a level-zero disparity map having a resolution of the stereo images,
   a level-one disparity map having a first resolution that is lower than the resolution of the stereo images, and
   a level-two disparity map having a second resolution that is lower than the first resolution.

3. The perception system of claim 2, wherein:
   the level-zero disparity map provides disparity information for at least a far-distance region of the final disparity map, the far-distance region including a distance of approximately 150 meters from the vehicle,
   the level-two disparity map provides disparity information for at least a near-distance region of the final disparity map, the near-distance region including a distance of approximately 3 meters from the vehicle, and
   the level-one disparity map provides disparity information for at least an intermediate-distance region of the final disparity map, the intermediate distance region including a distance of approximately 75 meters from the vehicle.

4. The perception system of claim 2, wherein the computer processing system is further configured to:
   combine the preliminary disparity maps into a combined disparity map, and
   refine the combined disparity map by reducing noise in the combined disparity map and reducing a size of one or more invalid regions in the combined disparity map, to produce a refined disparity map.

5. The perception system of claim 1, wherein the stereo vision system comprises at least one pair of cameras separated by a baseline in a range of about 1 meter to about 4 meters.

6. The perception system of claim 1, wherein, in the identifying of the object to generate the final disparity map, the computer processing system identifies one or more objects in a near-field to far-field perception range of approximately 3 meters to at least approximately 150 meters from the vehicle.

7. The perception system of claim 6, wherein, wherein the one or more objects identified by the computer processing system have a dimension in a range of about 100 cm to about 20 cm.

8. A method of a small-object perception system used in a vehicle, the method comprising:
   obtaining stereo images captured by a stereo vision system;
   generating, by at least one computer processor, perception information from the stereo images; and
   outputting the perception information to a system controller configured to use the perception information to provide control signals to control a path of movement of the vehicle,
   wherein the stereo images comprise first and second initial images, and
   wherein the generating of the perception information comprises:
      performing stereo matching on the first and second initial images,
      generating a plurality of preliminary disparity maps from the first and second initial images, the preliminary disparity maps having different resolutions from each other,
      segmenting at least a subset of the first and second initial images to produce first and second super-pixel images,
      performing stereo matching on the first and second super-pixel images to produce a super-pixel disparity map, and
      identifying an object based on the super-pixel disparity map.

9. The method of claim 8, wherein the preliminary disparity maps comprise:
   a level-zero disparity map having a resolution of the stereo images,
   a level-one disparity map having a first resolution that is lower than the resolution of the stereo images, and
   a level-two disparity map having a second resolution that is lower than the first resolution.

10. The method of claim 9, wherein:
    the level-zero disparity map provides disparity information for at least a far-distance region of the super-pixel disparity map, the far-distance region including a distance of approximately 150 meters from the vehicle,
    the level-two disparity map provides disparity information for at least a near-distance region of the super-pixel disparity map, the near-distance region including a distance of approximately 3 meters from the vehicle, and
    the level-one disparity map provides disparity information for at least an intermediate-distance region of the final disparity map, the intermediate distance region including a distance of approximately 75 meters from the vehicle.

11. The method of claim 8, wherein the generating of the perception information comprises:
- combining the preliminary disparity maps into a combined disparity map, and
- refining the combined disparity map by reducing noise in the combined disparity map and reducing a size of one or more invalid regions in the combined disparity map, to produce a refined disparity map.

12. A non-transitory computer-readable storage medium storing code that, when executed by a computer system comprising at least one computer processor, causes the computer system to perform a method of a small-object perception system, wherein the method comprises:
- obtaining stereo images captured by a stereo vision system;
- generating perception information from the stereo images; and
- outputting the perception information to a system controller configured to use the perception information to provide control signals to control a path of movement of a vehicle,
- wherein the stereo images comprise first and second initial images, and
- wherein the generating of the perception information comprises:
  - performing stereo matching on the first and second initial images,
  - generating a plurality of preliminary disparity maps from the first and second initial images, the preliminary disparity maps having different resolutions from each other,
  - segmenting at least a subset of the first and second initial images to produce first and second super-pixel images,
  - performing stereo matching on the first and second super-pixel images to produce a super-pixel disparity map, and
  - identifying an object based on the super-pixel disparity map.

13. The computer-readable storage medium of claim 12, wherein the preliminary disparity maps comprise:
- a level-zero disparity map having a resolution of the stereo images,
- a level-one disparity map having a first resolution that is lower than the resolution of the stereo images, and
- a level-two disparity map having a second resolution that is lower than the first resolution.

14. The computer-readable storage medium of claim 13, wherein:
- the level-zero disparity map provides disparity information for at least a far-distance region of the super-pixel disparity map, the far-distance region including a distance of approximately 150 meters from the vehicle,
- the level-two disparity map provides disparity information for at least a near-distance region of the super-pixel disparity map, the near-distance region including a distance of approximately 3 meters from the vehicle, and
- the level-one disparity map provides disparity information for at least an intermediate-distance region of the final disparity map, the intermediate distance region including a distance of approximately 75 meters from the vehicle.

15. The computer-readable storage medium of claim 12, wherein the generating of the perception information comprises:
- combining the preliminary disparity maps into a combined disparity map, and
- refining the combined disparity map reducing noise in the combined disparity map and reducing a size of one or more invalid regions in the combined disparity map, to produce a refined disparity map.

\* \* \* \* \*